(12) United States Patent
Tsirkin et al.

(10) Patent No.: US 11,265,291 B2
(45) Date of Patent: Mar. 1, 2022

(54) MALICIOUS PACKET FILTERING BY A HYPERVISOR

(71) Applicant: Red Hat, Inc., Raleigh, NC (US)

(72) Inventors: Michael Tsirkin, Lexington, MA (US); Jiri Benc, Prague (CZ); Aaron Conole, Lowell, MA (US)

(73) Assignee: Red Hat, Inc., Raleigh, NC (US)

( * ) Notice: Subject to any disclaimer, the term of this patent is extended or adjusted under 35 U.S.C. 154(b) by 126 days.

(21) Appl. No.: 15/687,300

(22) Filed: Aug. 25, 2017

(65) Prior Publication Data

US 2019/0068555 A1 Feb. 28, 2019

(51) Int. Cl.
| | |
|---|---|
| H04L 29/06 | (2006.01) |
| G06F 9/455 | (2018.01) |
| G06F 21/00 | (2013.01) |
| G06F 21/53 | (2013.01) |

(52) U.S. Cl.
CPC ...... *H04L 63/0263* (2013.01); *G06F 9/45558* (2013.01); *G06F 21/00* (2013.01); *G06F 21/53* (2013.01); *H04L 63/0236* (2013.01); *H04L 63/0245* (2013.01); *H04L 63/1441* (2013.01); *H04L 63/20* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,496,961 | B2 | 2/2009 | Zimmer et al. |
| 7,640,591 | B1 | 12/2009 | Tripathi et al. |
| 8,250,641 | B2 | 8/2012 | Morgan et al. |
| 8,938,611 | B1* | 1/2015 | Zhu ............... G06F 21/575 |
| | | | 713/153 |
| 9,166,988 | B1* | 10/2015 | Shin ............... H04L 63/20 |
| 9,183,021 | B2 | 11/2015 | Dinn |
| 9,276,875 | B2 | 3/2016 | Dong et al. |
| 9,419,897 | B2 | 8/2016 | Cherian et al. |
| 9,557,992 | B2 | 1/2017 | Tashiro et al. |

(Continued)

FOREIGN PATENT DOCUMENTS

CN 103023912 A 4/2013

OTHER PUBLICATIONS

Firestone, VFP: A Virtual Switch Platform for Host SDN in the Public Cloud, 2017, 14th USENIX Symposium in the Networked Systems Design and Implementation (NSDI'17), pp. 315-328. (Year: 2017).*

(Continued)

*Primary Examiner* — Luu T Pham
*Assistant Examiner* — Edward X Long
(74) *Attorney, Agent, or Firm* — Lowenstein Sandler LLP

(57) ABSTRACT

A method includes accessing, by a hypervisor executing by a processing device, a filtering queue that stores at least one packet determined to be malicious by a virtual machine, generating, by the hypervisor, a filtering rule in view of characteristics of the at least one packet determined to be malicious, and storing the filtering rule in a data store to apply to subsequent packets addressed to the virtual machine to determine whether any of the subsequent packets have similar characteristics with the at least one packet determined to be malicious.

18 Claims, 14 Drawing Sheets

(56) References Cited

U.S. PATENT DOCUMENTS

| | | | |
|---|---|---|---|
| 2006/0282660 A1* | 12/2006 | Varghese | G06Q 20/4016 713/155 |
| 2012/0185633 A1 | 7/2012 | Sano | |
| 2013/0227556 A1 | 8/2013 | Tsirkin et al. | |
| 2014/0269379 A1* | 9/2014 | Holbrook | H04L 43/0882 370/252 |
| 2014/0296379 A1* | 10/2014 | Christiano | C08G 77/80 523/400 |
| 2014/0317677 A1 | 10/2014 | Vaidya et al. | |
| 2015/0207662 A1 | 7/2015 | Basso et al. | |
| 2016/0080414 A1* | 3/2016 | Kolton | H04L 63/1491 726/23 |
| 2016/0277447 A1* | 9/2016 | Pope | H04L 63/0227 |
| 2016/0299777 A1 | 10/2016 | Tsirkin | |
| 2016/0380865 A1 | 12/2016 | Dubai et al. | |
| 2017/0093677 A1 | 3/2017 | Skerry et al. | |
| 2017/0104679 A1 | 4/2017 | Sunavala | |
| 2017/0155724 A1 | 6/2017 | Haddad et al. | |
| 2017/0171159 A1* | 6/2017 | Kumar | H04L 63/0281 |
| 2017/0177396 A1 | 6/2017 | Palermo et al. | |
| 2017/0289068 A1 | 6/2017 | Palermo | |
| 2018/0254981 A1 | 9/2018 | Babu | |
| 2019/0044812 A1 | 2/2019 | Loftus et al. | |
| 2019/0050273 A1 | 2/2019 | Tamir et al. | |
| 2019/0068491 A1 | 2/2019 | Tsirkin | |
| 2019/0205140 A1 | 7/2019 | Grisenthwaite et al. | |
| 2020/0341885 A1 | 10/2020 | Plummer | |

OTHER PUBLICATIONS

Ma et el., A Design of Firewall Based on Feedback of Intrusion Detection System in Cloud Environment, 2019, pp. 1-6 (Year: 2019).*

Fitzmacken, Neira, Squillace, Diogenes (Jan. 9, 2017) Getting started with Microsoft Azure security. Retrieved May 26, 2017 from https://docs.microsoft.com/enus/azure/security/azuresecuritygettingstarted. 11 pages.

Kourai K., Azumi, T., & Chiba, S. (Apr. 1, 2014) Efficient and Fine-grained VMM-level Packet Filtering for Self-protection. International Journal of Adaptive, Resilient and Autonomic Systems (IJARAS), 5(2), 83-100. 18 pages.

Cartee et al. Apr. 3-6, 2017. "Open Networking Summit 2017". https://ons2017.sched.com/event/9ktv/io-visor-programmable-in-kernel-data-plane-with-ebpf-and-xdp-wendy-cartee-deepa-kalani-io-visor-project. Retrieved on Jun. 27, 2017. 3 pages.

Dredge, Simon. Dec. 31, 2015. "Accelerating the NFV Data Plane: SR-IOV and DPDK . . . in my own Words". www.metaswitch.com/the-switch/accelerating-the-nfv-data-plane. Retrieved on Jun. 28, 2017. 15 pages.

Unknown. "Software Defined Networking SDN100". 2017. https://training.mirantis.com/wp-content/uploads/2017/06/Mirantis-SDN100.pdf. Retrieved on Jun. 28, 2017. 2 pages.

Hoiland-Jorgensen, Toke et al., Karlstad University; Red Hat; Cilium.io; Quantonium Inc.; Cumulus Networks, "The Express Data Path: Fast Programmable Packet Processing in the Operating System Kernel", https://dl.acm.org/citation.cfm?id=3281443, Dec. 4-7, 2018, 13 pages.

Kicinski, Jakub and Viljoen, Nicolaas, Netronome Systems Cambridge, United Kingdom, "eBPF Hardware Offload to SmartNICs: CLS BPF and XDP", https://open-nfp.org/documents/1/eBPF_HW_OFFLOAD_HNiMne8.pdf, Nov. 10, 2016, 6 pages.

Kicinski, Jakub, Netronome Systems Santa Clara, United States, "XDP Hardware Offload: Current Work, Debugging and Edge Cases", https://www.netronome.com/media/documents/viljoen-xdpoffload-talk_2.pdf, 5 pgaes.

"Scholz, Dominik, et al., Chair of Network Architectures and Services, Department of Informatics, Technical University of Munich, ""Performance Implications of Packet Filtering with Linux eBPF"", https://www.net.in.tum.de/fileadmin/bibtex/publications/papers/ITC30-Packet-Filtering-eBPF-XDP.pdf, Oct. 21, 2018, 9 pages".

Unknown. "Network Functions Virtualization". http://www.rulepaper.com/COURSE%20SET%201/pdf/Network_Functions_Virtualization.PDF. Retrieved on Aug. 22, 2017. 4 pages.

Unknown. "2017 NFV Report Series Part I: Foundations of NFV: NFV Inftastructure and VIM". 2017. http://events.windriver.com/wrcd01/wrcm/2017/06/report-foundation-of-nfv-infrastructure-and-vim-2.pdf. Retrieved on Jun. 28, 2017. 55 pages.

Borkmann et al., "BPF and XDP Reference Guide", Nov. 5, 2018, [retrieved on Apr. 23, 2021] Retrieved from <URL://github.com/cilium/cilium/blob/5913999bfcb6de31791a78a6c379e2f7a3f0b499/Documentation/bpf.rst>, pp. 1-50 (Year: 2018).

USPTO, Office Action for U.S. Appl. No. 15/688,794, dated Apr. 4, 2019.

USPTO, Notice of Allowance for U.S. Appl. No. 15/688,794, dated Nov. 20, 2019.

USPTO, Office Action for U.S. Appl. No. 16/551,522, dated Jun. 14, 2021.

* cited by examiner

MALICIOUS PACKET FILTERING BY A HYPERVISOR

TECHNICAL FIELD

The present disclosure is generally related to virtualization, and is more specifically related to malicious packet filtering by a hypervisor.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected to each other via one or more wired (e.g., Ethernet) and/or wireless (e.g., WiFi) networks (e.g., the Internet, local area network). Additionally, the hosts may be connected to other devices external to the clusters via the networks. In some instances, malicious packets may be sent to the various virtual machines executing via hypervisors on the hosts in an attempt to perform undesirable activity (e.g., deny service, install a virus, misappropriate data, etc.).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
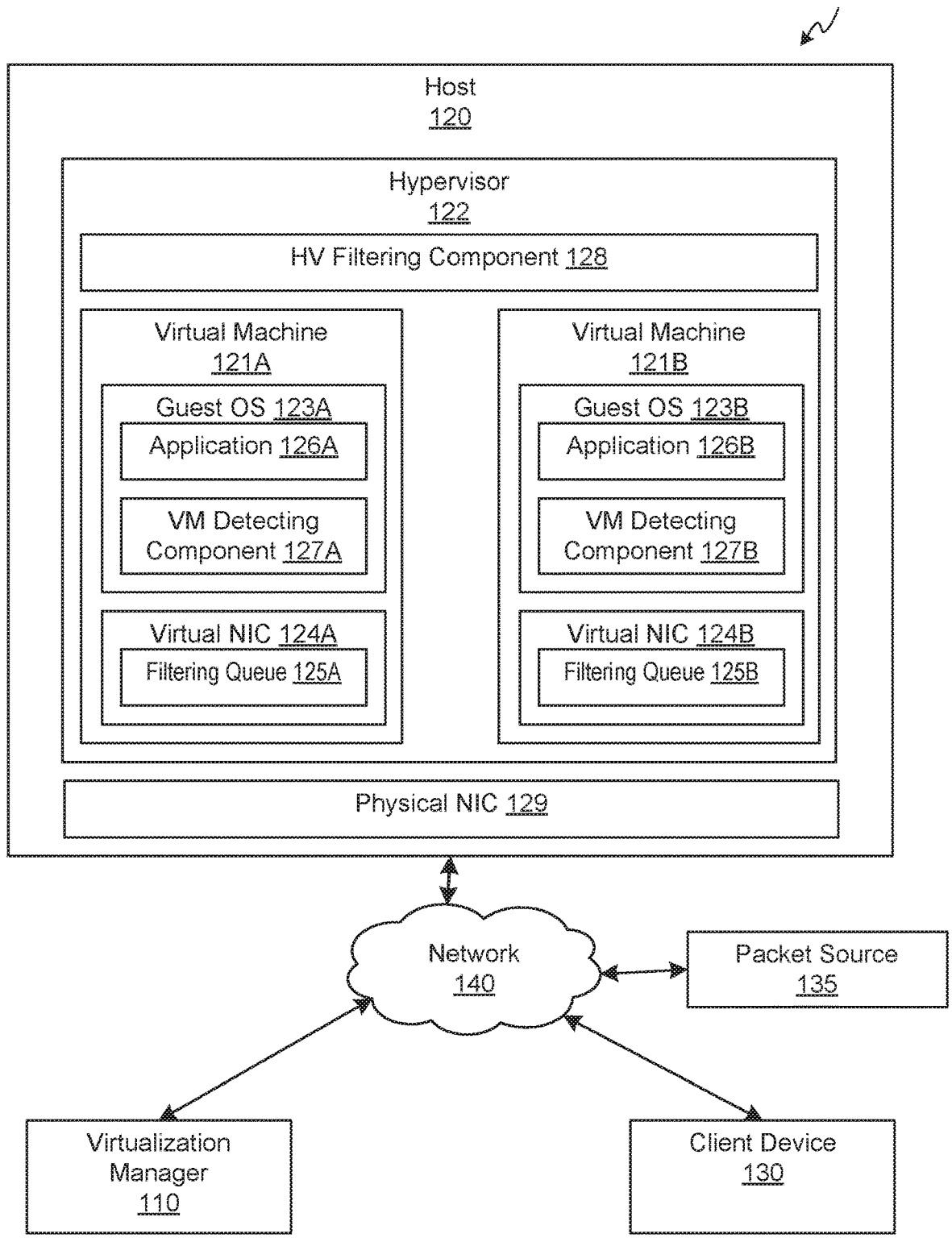
FIG. 1 depicts a high-level diagram of an example system architecture operating in accordance with one or more aspects of the present disclosure.

Hosts that execute hypervisors to run one or more virtual machines may be used to provide various services. However, the hosts that communicate over a network may be vulnerable to various types of network related security issues. For example, a denial of service attack may be a large threat faced by service providers. One or more malicious sources may attempt to flood the hosts, virtual machines, and/or applications running on the virtual machines of the service providers in an attempt to make the services unavailable. In other examples, malicious sources may send malicious packets with unexpected data to the various virtual machines. The unexpected data may include a command instead of a username, for example, and the command may execute to install a virus on the host or extract confidential data.

Conventionally, to handle such malicious packets, a virtual machine may process incoming packets and search for patterns that do not match expected usage. If a pattern is found, the incoming packet is used to create a filtering rule and the incoming packet is discarded by the virtual machine. Any subsequent incoming packets received by the VM are then compared to the filtering rule and discarded if the subsequent incoming packets share characteristics with the previous packet determined to be malicious. However, this technique may be inefficient, as the virtual machines may be woken up just to discard incoming packets that match the filtering rule. Further, every virtual machine is executing their filtering rule, which may degrade performance of the hosts.

In addition, the incoming packets may be encrypted and just an application on the virtual machine to which the incoming packets are addressed may hold the key to decrypt the packets. Thus, in these instances, a hypervisor executing the virtual machines may not be able to decrypt the incoming packets to determine whether the incoming packets are malicious.

Accordingly, aspects of the present disclosure generally relate to using logic on the virtual machine to determine whether packets are malicious and using logic on a hypervisor to create a filtering rule for the malicious packet to filter subsequent packets that match characteristics of the malicious packet. The virtual machine may add the packets determined to be malicious to a filtering queue that interfaces with the hypervisor. The filtering queue may be located in a virtual network interface card (NIC) of the virtual machine. In an implementation, the filtering queue may be used solely for malicious packets.

As such, the hypervisor may determine that any packet accessed in the filtering queue is malicious and may generate a filtering rule for the malicious packet in view of one or more characteristics of the malicious packet. The characteristics may include a source address of the source of the malicious packet, a snippet of data from the malicious packet, or the like. The filtering rule may specify an action to take, such as block the malicious packet, discard the malicious packet, or the like. The hypervisor may store the filtering rules in a data store to apply to determine whether to take action on subsequent packets. Using the hypervisor to apply the filtering rules may enhance the performance of the host because resources (e.g., processing, memory) are used more efficiently by removing the filtering logic from the virtual machines and avoiding waking up the virtual machines just to discard packets.

In an implementation, the virtual machine may add metadata to the malicious packet prior to adding the malicious packet to the filtering queue. The metadata may indicate a type of malicious packet. For example, the type may indicate "denial of service," "distributed denial of service," "ping of death," and so forth. The hypervisor may add the metadata associated with the malicious packet to the filtering rule created for that malicious packet. If the filtering rule is applied to take action on a subsequent packet, the hypervisor may log the action (e.g., discard) taken and the metadata (e.g., type of malicious packet) in an event log. In another implementation, the virtual machine may add metadata to a packet to indicate that the packet is no longer malicious and the virtual machine may send a signal to the hypervisor. In such an instance, the hypervisor may disable (e.g., remove, suspend) a filtering rule associated with the packet indicated as no longer being malicious.

In another implementation, a hypervisor may execute numerous virtual machines, and the information obtained from one virtual machine may be used to protect other virtual machines. For example, the hypervisor may create a filtering rule for a packet determined to be malicious by a first virtual machine and apply the filtering rule to determine whether subsequent packets addressed to the first virtual machine and subsequent packets addressed to a second virtual machine are malicious. In such an instance, the first virtual machine and the second virtual machine may satisfy a trust condition, such as the first virtual machine and the second virtual machine being owned by the same user.

In yet another implementation, several of the virtual machines running on the hypervisor may determine that packets sharing the same characteristics are malicious. As such, the hypervisor may generate a similar filtering rule in view of the characteristics of the malicious packets accessed in different respective filtering queues of the virtual machines. The hypervisor may recognize that the filtering rules are similar and add one of the filtering rules to a physical NIC of the host. Additionally or alternatively, the hypervisor may recognize that the malicious packets accessed in the filtering queues are similar and generate one filtering rule that is installed on the physical NIC. The physical NIC may apply the filtering rule to any subsequent packets that are determined to match one or more characteristics of the malicious packets. Using the physical NIC to apply the filtering rule may further enhance performance because neither the hypervisor nor the virtual machine may be involved in filtering subsequent packets. In instances where the physical NIC does not support filtering, the hypervisor may install one of the filtering rules for incoming packets addressed to several of the virtual machines, even if the virtual machines do not satisfy a trust condition.

In yet another implementation, the hypervisor may disable the filtering rule at a desired point in time. For example, after a predefined time period, the hypervisor may disable (e.g., remove, temporarily suspend) a particular filtering rule to allow subsequent packets having characteristics specified in the disabled filtering rule to be sent to a virtual machine. This may enable the virtual machine to make another determination of whether the packet is malicious. In an example, the virtual machine may send a signal to the hypervisor that the packet is no longer malicious. In another example, the virtual machine may not notify the hypervisor that the packet is no longer malicious. In yet another example, if the virtual machine determines that the packet is malicious again, the virtual machine may add the packet to the filtering queue for filtering by the hypervisor.

FIG. 1 illustrates an example system architecture 100 in which implementations of the disclosure may operate. The system architecture 100 may include a virtualization manager 110, a host system 120 (hereinafter "host 120"), a client device 130, and one or more packet sources 135 coupled via a network 140. Although one host 120 is shown, it should be understood that any suitable number of hosts may be included in the system architecture 100 and the other hosts may include similar components and features as the host 120. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The host 120 may comprise one or more processors communicatively coupled to memory devices and input/output (I/O) devices. The host 120 may run a plurality of virtual machines 121A and 121B by executing a hypervisor 122, respectively, to abstract the physical layer, including processors, memory, and I/O devices, and present this abstraction to the virtual machines 121A and 121B as virtual devices. The hypervisor 122 may be a product of Red Hat® and may include Red Hat® Virtualization (RHV), which is a product based on a kernel-based virtual machine (KVM) hypervisor. Additionally or alternatively, the hypervisor 122 may be a vSphere hypervisor of VMware®, a Hyper-V hypervisor of Microsoft®, or a hypervisor included in Oracle® VM VirtualBox.

The hypervisor 122 may create, run, manage, and monitor various aspects of virtual machines operation, including the processing, and storage, memory, and network interfaces. For example, as depicted, the hypervisor 122 may run virtual machines 121A and 121B. The virtual machines 121A and 121B may each execute a guest operating system 123A and 123B that may utilize the underlying virtual devices, including virtual processors, virtual memory, virtual network interface cards (NICs) 124A and 124B, and virtual I/O devices. According to an implementation, each virtual NIC 124A and 124B includes a filtering queue 125A and 125B designated for packets determined to be malicious by the virtual machines 121A and 121B, respectively. The filtering queues 125A and 125B may provide a special interface with the hypervisor 122 whereby the hypervisor 122 understands that any packet placed in the filtering queues 125A and 125B are malicious packets.

The packet source 135 may be another host in the same cluster as the host 120 or a different cluster within a datacenter. Additionally or alternatively, the packet source 135 may be any suitable networking device capable of sending packets. The packet source 135 may include numerous networking devices. For example, the packet source 135 may be one or more servers, switches, relays, routers, bridges, or the like. The packet source 135 may be external to the datacenter in which the host 120 is located. In an implementation, the packet source 135 may send packets addressed to the virtual machine 121A or 121B. In another implementation, the packets may be addressed to a particular endpoint (e.g., application 126A or 126B) on the virtual machine 121A or 121B. The host 120 may include one or more physical network interface cards (NICs) 129 that receive the packets from the packet source 135 via the network 140. The hypervisor 122 may be communicatively connected to the physical NIC 129 via a bridge of the host 120. The physical NIC 129 may transmit the packets to the hypervisor 122 and the hypervisor 122 may forward the packets to their destination (e.g., virtual machine 121A or 121B, application 126A or 126B, etc.). In one implementation, the packets may originate and be sent from a device or application internal to the host 120.

In some instances, the packets sent from the packet source 135 may be malicious packets attempting to cause some undesirable effect on the applications 126A or 126B, the guest operating systems 123A or 123B, the virtual machines 121A or 121B, the hypervisor 122, and/or the host 120. As described in detail below, aspects of the present disclosure relate to detecting these malicious packets on the virtual machines 121B and 121B and filtering (e.g., blocking, discarding) the malicious packets using the hypervisor 122 in a performance improving and efficient manner.

The applications 126A and 126B may be running on each of the virtual machines 121A and 121B under the guest operating systems 123A and 123B. The applications 126A and 126B may include system level applications or high level applications (e.g., productivity applications (word processing, presentation, spreadsheet, email, calendar, etc.), browsers, etc.). The guest operating systems 123A and 123B may include a virtual machine (VM) detecting component 127A and 127B. Although shown as a component of the guest operating system 123A and 123B, the VM detecting components 127A and 127B may be included as part of the applications 126A and 126B, respectively. The VM detecting components 127A and 127B may include logic implemented as computer instructions stored in one or more memories and executed by one or more processing devices of the host 120.

The VM detecting component 127A and 127B may include logic for determining when packets are malicious. For example, the logic may search the packets for patterns of unexpected data usage (e.g., including a command where a data field is expected) and determine that packets including the unexpected data usage are malicious. If a packet is determined to be malicious, the VM detecting components 127A and 127B may add the malicious packet to the appropriate filtering queue 125A and 125B. In an implementation, a counter (e.g., 8 bit) may be used to accumulate a sample of malicious packets on the local storage of the virtual machines 121A and 121B prior to adding the sample of malicious packets to the filtering queues 125A and 125B. This technique may regulate the flow of malicious packets to the hypervisor 122.

Further, in some instances, prior to adding the malicious packets to the filtering queues 125A and 125B, the VM detecting components 127A and 127B may add metadata to the malicious packets. The metadata may include the source address of the packet source 135 from where the packets originated and a type of malicious packet, among other things. In another example, as explained further below, the VM detecting component 127A and 127B may add metadata to a packet that is determined to no longer be malicious and may send a signal including the packet and the metadata to the hypervisor 122 to enable the hypervisor 122 to disable any filtering rules associated with the packet or update the filtering rules.

The hypervisor 122 may include a hypervisor (HV) filtering component 128. The HV filtering component 128 may include logic implemented as computer instructions stored in one or more memories and executed by one or more processing devices of the host 120. The HV filtering component 128 may access the filtering queues 125A and 125B to retrieve the packets determined to be malicious by the virtual machines 121A and 121B. Further, the HV filtering component 128 may generate a filtering rule for each of the packets in view of one or more characteristics of the packets. Further, the HV filtering component 128 may add the metadata provided with the malicious packet by the virtual machine 121A or 121B to the generated filtering rules. The filtering rules may be stored in a data store.

The filtering rules may be applied to subsequent packets addressed to the virtual machine 121A or 121B to determine whether to discard the subsequent packets when they match one or more characteristics of the packet determined to be malicious. The HV filtering component 128 may use various techniques, such as machine learning, when determining whether the characteristics match the filtering rules. A model may be generated using the packets determined to be malicious by the virtual machine 121A or 121B and the model may be used to predict when subsequent packets match characteristics of the malicious packet. The HV filtering component 128 may log the filtering action performed by applying the filtering rules and the metadata associated with the filtering rules applied in an event log. Such logging may aid debugging or troubleshooting by the hypervisor 122 or an administrator.

In an implementation, the HV filtering component 128 may apply a filtering rule generated for the virtual machine 121A to determine whether to discard packets addressed to another virtual machine (e.g., virtual machine 121B). That is, the filtering rule may be applied to determine whether subsequent packets addressed to the virtual machine 121A and whether subsequent packets addressed to the virtual machine 121B match characteristics of the packet determined to be malicious by the virtual machine 121A. In this way, information about malicious packets detected by one virtual machine may be used to protect the other virtual machines running via the hypervisor 122.

In another implementation, the VM detecting component 127A and 127B may separately determine that packets sharing the same characteristics are malicious. As such, the VM detecting component 127A and 127B may add the packets to the respective filtering queue 125A and 125B. The hypervisor 122 may access the filtering queues 125A and 125B to retrieve the packets and generate a similar filtering rule in view of the characteristics of the malicious packets. The hypervisor 122 may determine that the filtering rules are similar and install one of the filtering rules to the physical NIC 129. Additionally or alternatively, the hypervisor 122 may determine that the malicious packets accessed in the filtering queues 125A and 125B are similar and generate one filtering rule that is installed on the physical NIC 129. In instances where the physical NIC 129 does not support filtering, the hypervisor 122 may execute one of the filtering rules for incoming packets for the virtual machines 121A and 121B. In an example, the hypervisor 122 may execute the filtering rule for incoming packets of the virtual machines 121A and 121B when the virtual machines 121A and 121B satisfy a trust condition or when the virtual machines 121A and 121B do not satisfy a trust condition.

In yet another implementation, the hypervisor 122 may disable (e.g., remove, temporarily suspend) a filtering rule after a predefined period of time. For example, the hypervisor 122 may disable a particular filtering rule to allow subsequent packets having characteristics specified in the disabled filtering rule to be sent to a virtual machine 121A or 121B to facilitate determination of whether the packet is malicious.

In yet another implementation, the hypervisor 122 may communicate with the virtualization manager 110 using a Virtual Desktop and Server Management (VDSM) daemon (not shown). The VDSM daemon may include an application programming interface (API) with which the virtualization manager 110 interfaces. The VDSM or any suitable application executing on of the host 120 may provide status notifications to the virtualization manager 110 that indicate the operating state of the hypervisor 122 and/or the virtual machines 121A and 121B. The status notification may be transmitted by the VDSM or other application when the hypervisor 122 generates a filtering rule. The virtualization manager 110 may notify another hypervisor executing on another host in the virtualization environment of the filtering rule generated by the hypervisor 122. This may enable other hypervisors to apply the filtering rule to filter subsequent packets addressed to virtual machines on other hosts, as well. Likewise, the other hosts may install the filtering rules on their physical NICs, if desired.

The virtualization manager 110 may be hosted by a computer system and include one or more computer programs executed by the computer system for centralized management of the system architecture 100. In one implementation, the virtualization manager 110 may comprise various interfaces, including administrative interface, reporting interface, and/or application programming interface (API) to communicate with the client device 130 (e.g., laptop, desktop, tablet, smartphone, server), the host 120 of system architecture 100, as well as to user portals, directory servers, and various other components, which are omitted from FIG. 1 for clarity. An administrator may use the client device 130 to view the event log to determine what filtering actions have been performed by the hypervisor 122 and what type of malicious packets have been detected and filtered (e.g., blocked, discarded). The event log may aid in troubleshooting and/or debugging if issues arise on the host 120.

Figure 2:
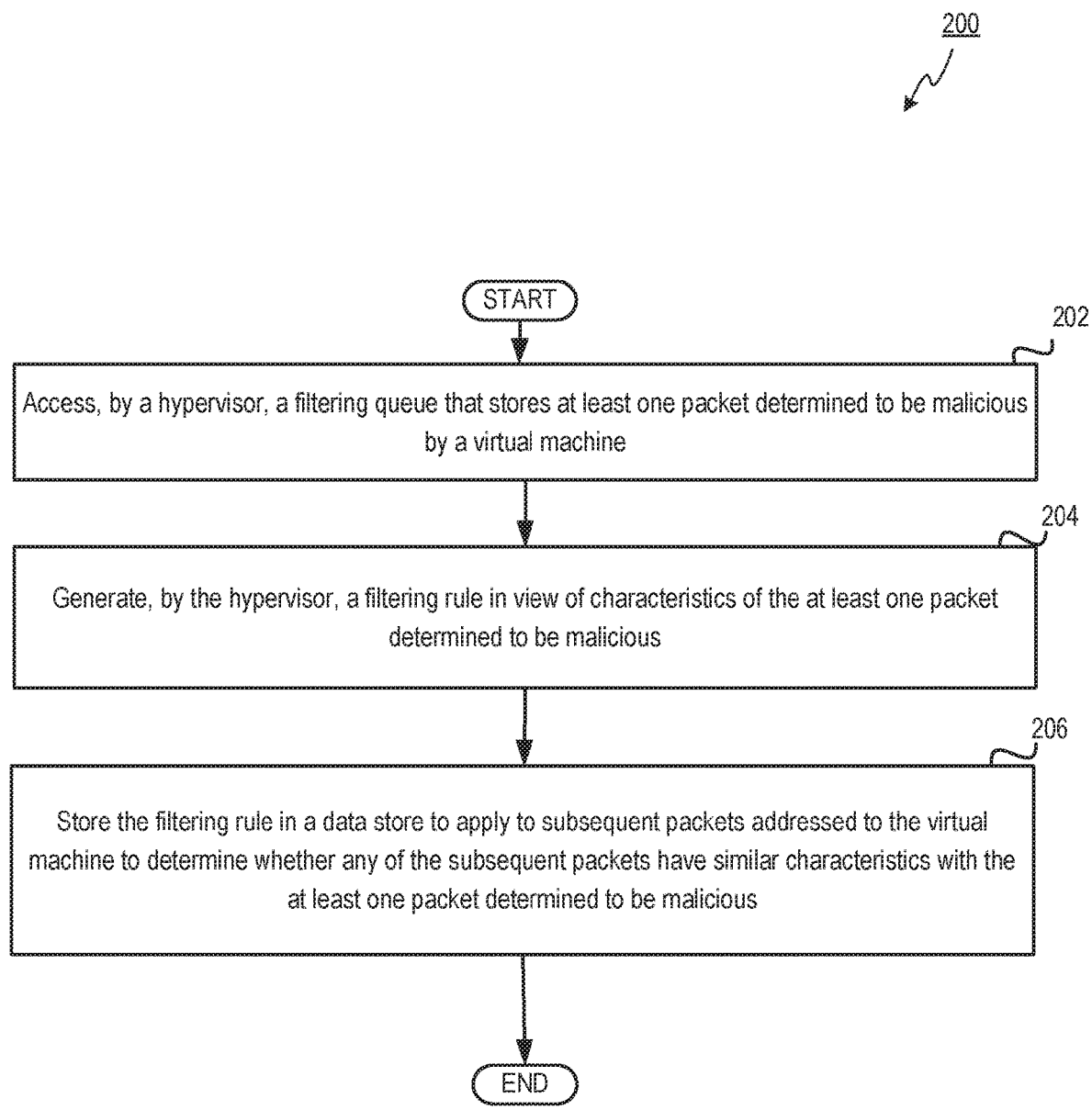
FIG. 2 depicts a flow diagram of an example method for a hypervisor generating a filtering rule in view of a packet determined to be malicious by a virtual machine, in accordance with one or more aspects of the present disclosure.

FIG. 2 depicts a flow diagram of an example method for a hypervisor generating a filtering rule in view of a packet determined to be malicious by a virtual machine, in accordance with one or more aspects of the present disclosure. Method 200 and each of its individual functions, routines, subroutines, or operations may be performed by one or more processing devices of the computer device executing the method 200. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the HV filtering component 128 of the hypervisor 122 executed by one or more processing devices of the host 120.

Method 200 may begin at block 202. At block 202, a processing device may access a filtering queue 125A that stores at least one packet determined to be malicious by a virtual machine 121A. The filtering queue 125A may be located in the virtual NIC 124A of the virtual machines 121A. Further, in an implementation, the filtering queue 125A may be designated solely for packets that are determined to be malicious by the VM detecting component 127A. In an example, the application 126A running the VM detecting component 127A may flag packets as being malicious after recognizing a pattern of unexpected data usage and may add the malicious packets to the filtering queue 125A. In another example, the guest operating system 123A running the VM detecting component 127A may flag the packets as being malicious and may add the malicious packets to the filtering queue 125A. In an implementation, the VM detecting component 127A may add metadata to the packet prior to adding the packet to the filtering queue 125A. The metadata may provide a status indication (e.g., that the packet is malicious), a type of malicious packet that is detected, a source address of the packet source 135 from which the malicious packet was sent, and the like.

At block 204, the processing device may generate a filtering rule in view of characteristics of the at least one packet determined to be malicious. Further, in instances where the virtual machine 121A added metadata to the malicious packet prior to adding the malicious packet to the filtering queue 125A, the processing device may identify the metadata added to the packet and add the metadata to the filtering rule associated with the packet.

In an implementation, the processing device may also access a second filtering queue 125B of a second virtual machine 121B. The second filtering queue 125B may store at least a second packet determined to be malicious by the second virtual machine 121B. The processing device may generate a second filtering rule in view of characteristics of the second packet determined to be malicious. In response to determining that the filtering rule and the second filtering rule are similar or the packet and the second packet share similar characteristics, the processing device may install the filtering rule in the physical NIC 129 to apply to packets at the physical NIC 129 to determine whether any of the packets have similar characteristics with the packet and the second packet determined to be malicious.

At block 206, the processing device may store the filtering rule in a data store to apply to subsequent packets addressed to the virtual machine to determine whether any of the subsequent packets have similar characteristics with the at least one packet determined to be malicious. For example, the processing device may receive a subsequent packet addressed to the virtual machine 121A from the physical NIC 129. In response to determining that the subsequent packet has similar characteristics with the packet determine to be malicious, the filtering rule may be applied to filter (e.g., block, discard) the subsequent packet, thereby preventing the subsequent packet from being sent to the virtual machine 121A. In an implementation, the processing device may log, in an event log, the filtering action (e.g., discarding) performed on the subsequent packet by applying the rule along with the metadata included in the filtering rule. As may be appreciated, if the virtual machine 121A is sleeping, not sending the subsequent packet to the virtual machine 121A may enable the virtual machine 121A to remain asleep and reduce resource usage of the host 120.

In an implementation, the processing device may apply the filtering rule to packets addressed to a second virtual machine (e.g., virtual machine 121B) that satisfies a trust condition with the virtual machine 121A. The trust condition may verify whether the virtual machine 121A and the virtual machine 121B belong to a same user, for example.

In another implementation, the processing device may disable the filtering rule after a predefine period of time. For example, the processing device may remove the filtering rule after a predefined period of time and transmit subsequent packets to the virtual machine 121A to facilitate determination of whether the subsequent packets are malicious. In another example, the processing device may temporarily suspend the filtering rule for a set period of time (e.g., seconds, minutes, hours) and send subsequent packets to the virtual machine 121A to facilitate determination of whether the subsequent packets are malicious while the filtering rule is temporarily suspended.

In another implementation, the processing device may receive a signal from the virtual machine 121A. The signal may include a packet that was previously determined to be malicious by the virtual machine 121A and metadata included with the packet. The metadata may provide an indication that the packet is no longer flagged as malicious by the virtual machine 121A. For example, in some instances, the virtual machine 121A may install an update to the application 126A. The update may eliminate the malicious activity that may be caused by the packet. Thus, the virtual machine 121A may notify the hypervisor 122 that the packets are no longer flagged as malicious. The processing device of the hypervisor 122 may disable a filtering rule associated with the packet. Further, the processing device may use the data related to the packet no longer being malicious to update any models used to predict whether subsequent packets are malicious.

Figure 3:
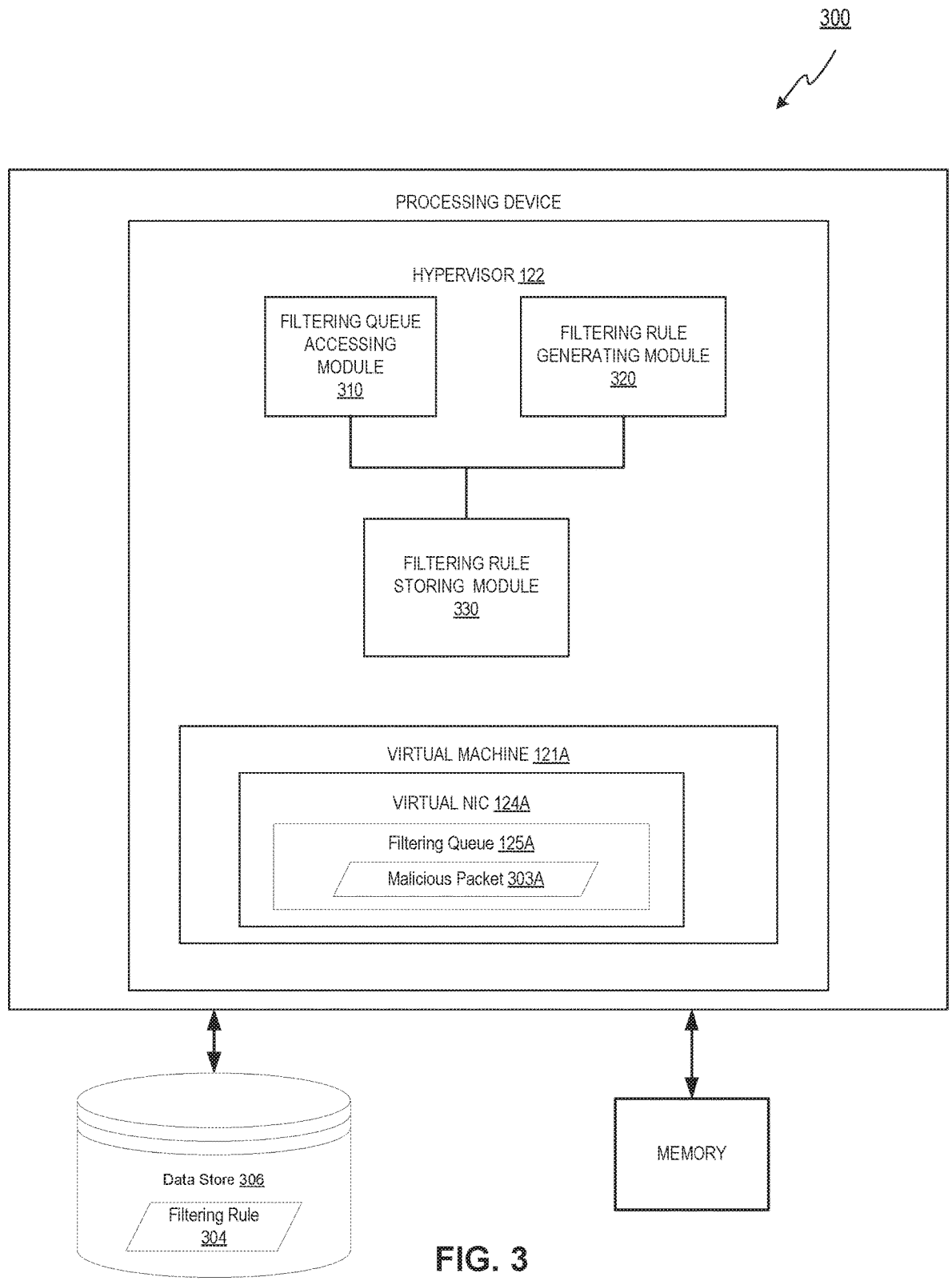
FIG. 3 depicts a block diagram of an example computer system for performing the method of FIG. 2, in accordance with one or more aspects of the present disclosure.

FIG. 3 depicts a block diagram of an example computer system 300 for performing the method of FIG. 2, in accordance with one or more aspects of the present disclosure. Computer system 300 may be the same or similar to the host 120 and may include one or more processing devices and one or more memory devices. In the example shown, computer system 300 may include filtering queue accessing module 310, filtering rule generating module 320, and filtering rule storing module 330. Also, as depicted, computer system 300 may be communicatively coupled to a data store 306.

The filtering queue accessing module 310 may access the filtering queue 125A that stores at least one packet 303A determined to be malicious by the virtual machine 121A. The filtering queue 125A may be located in the virtual NIC 124A of the virtual machines 121A. prior to adding the malicious packet 303A to the filtering queue 125A, the VM detecting component 127A of the virtual machine 124A may add metadata to the malicious packet 303A that indicates at least a type of the malicious packet 303A. The VM detecting component 127A may add the malicious packet 303A including the metadata to the filtering queue 125A for filtering by the hypervisor 122.

The filtering rule generating module 320 may generate a filtering rule 304 in view of characteristics of the at least one packet 303A determined to be malicious. Further, in instances where the virtual machine 121A added metadata to the malicious packet 303A prior to adding the malicious packet 303A to the filtering queue 125A, the filtering rule generating module 320 may identify the metadata added to the malicious packet 303A and add the metadata to the filtering rule 304 associated with the malicious packet 304.

The filtering rule storing module 330 may store the filtering rule 304 in the data store 304 to apply to subsequent packets addressed to the virtual machine 121A to determine whether any of the subsequent packets have similar characteristics with the at least one packet 303A determined to be malicious. In instances where subsequent packets have similar characteristics (e.g., have the same source address) with the malicious packet 303A, the filtering rule 304 may be applied to discard those subsequent packets.

Figure 4:
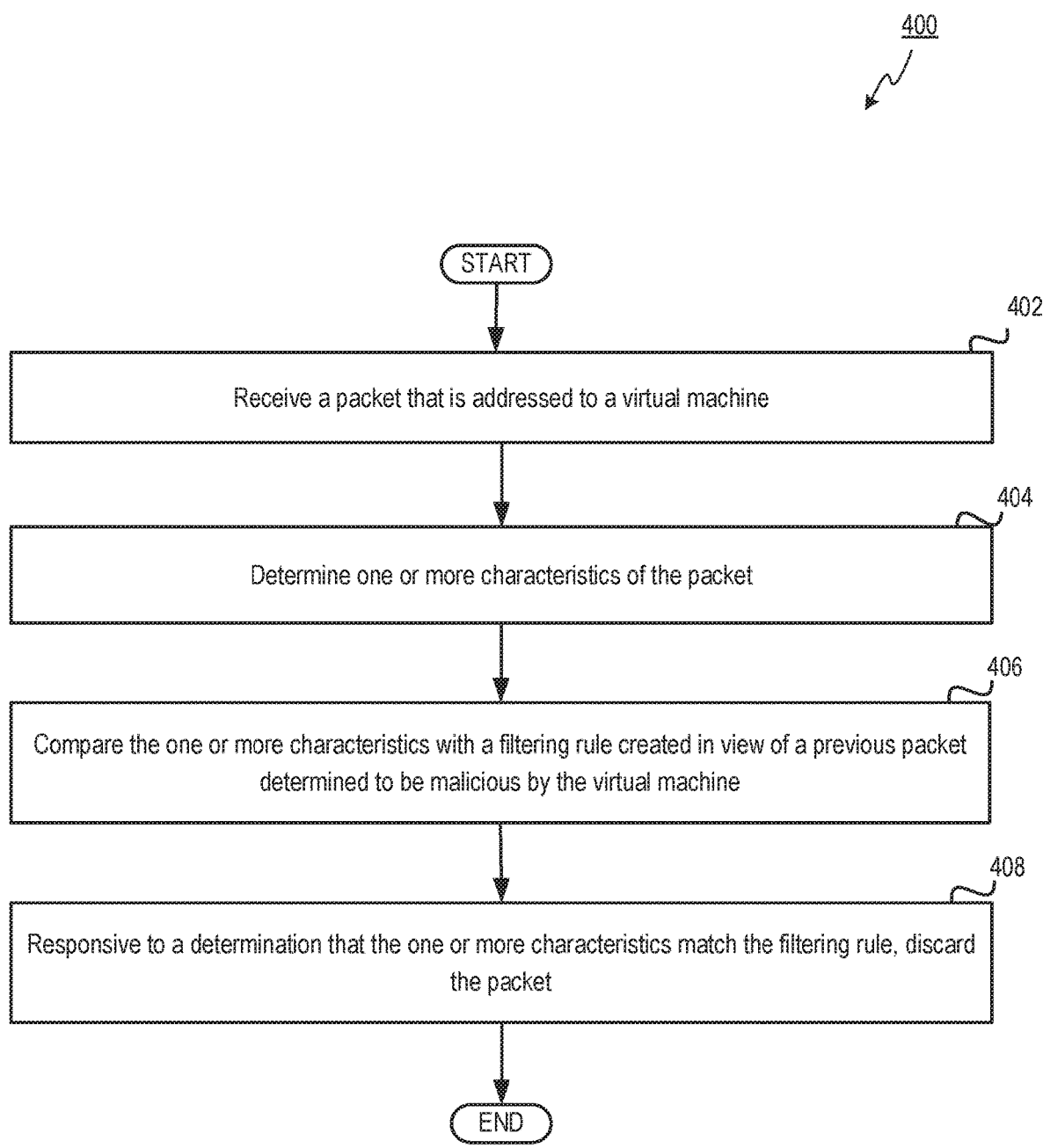
FIG. 4 depicts a flow diagram of an example method for a hypervisor applying a filtering rule to discard packets, in accordance with one or more aspects of the present disclosure.

FIG. 4 depicts a flow diagram of an example method 400 for a hypervisor 122 applying a filtering rule to discard packets, in accordance with one or more aspects of the present disclosure. Method 400 includes operations performed by the host 120. Also, method 400 may be performed in the same or a similar manner as described above in regards to method 200. Method 400 may be performed by processing devices of the host 120 executing HV filtering component 128 of the hypervisor 122.

Method 400 may begin at block 402. At block 402, the processing device may receive a packet that is addressed to the virtual machine 121A. The packet may be sent from the packet source 135 over the network 140, and the packet may be received by the processing device via the physical NIC 129 that communicates with the network 140.

At block 404, the processing device may determine one or more characteristics of the packet. For example, the processing device may inspect the packet to identify the source address of the packet, data fields in the packet, data types in the packet, format of the packet, and the like.

At block 406, the processing device may compare the one or more characteristics with a filtering rule create in view of a previous packet determined to be malicious by the virtual machine 121A. The filtering rule may have been created by the processing device in view of the previous packet by accessing the filtering queue 125A of the virtual machine 121A to retrieve the previous packet. The processing device may search the data store where the filtering rules are stored and traverse the filtering rules until a match is found or the filtering rules are exhausted.

At block 408, responsive to a determination that the one or more characteristics match the filtering rule, the processing device may filter (e.g., block, discard) the packet. Discarding the packet may refer to deleting the packet from memory. Blocking the packet may refer to storing the packet in memory of the host 120 without sending the packet to the virtual machine 121A. Additionally or alternatively, responsive to a determination that the filtering rule(s) does not match the one or more characteristics of the packet, the processing device may transmit the packet to the virtual machine 121A. Also, in an implementation, after a predefined time period, the processing device may remove the filtering rule and receive a subsequent packet addressed to the virtual machine 121A. The processing device may transmit the subsequent packet to the virtual machine 121A without determining whether one or more characteristics of the subsequent packet match the filtering rule.

Figure 5:
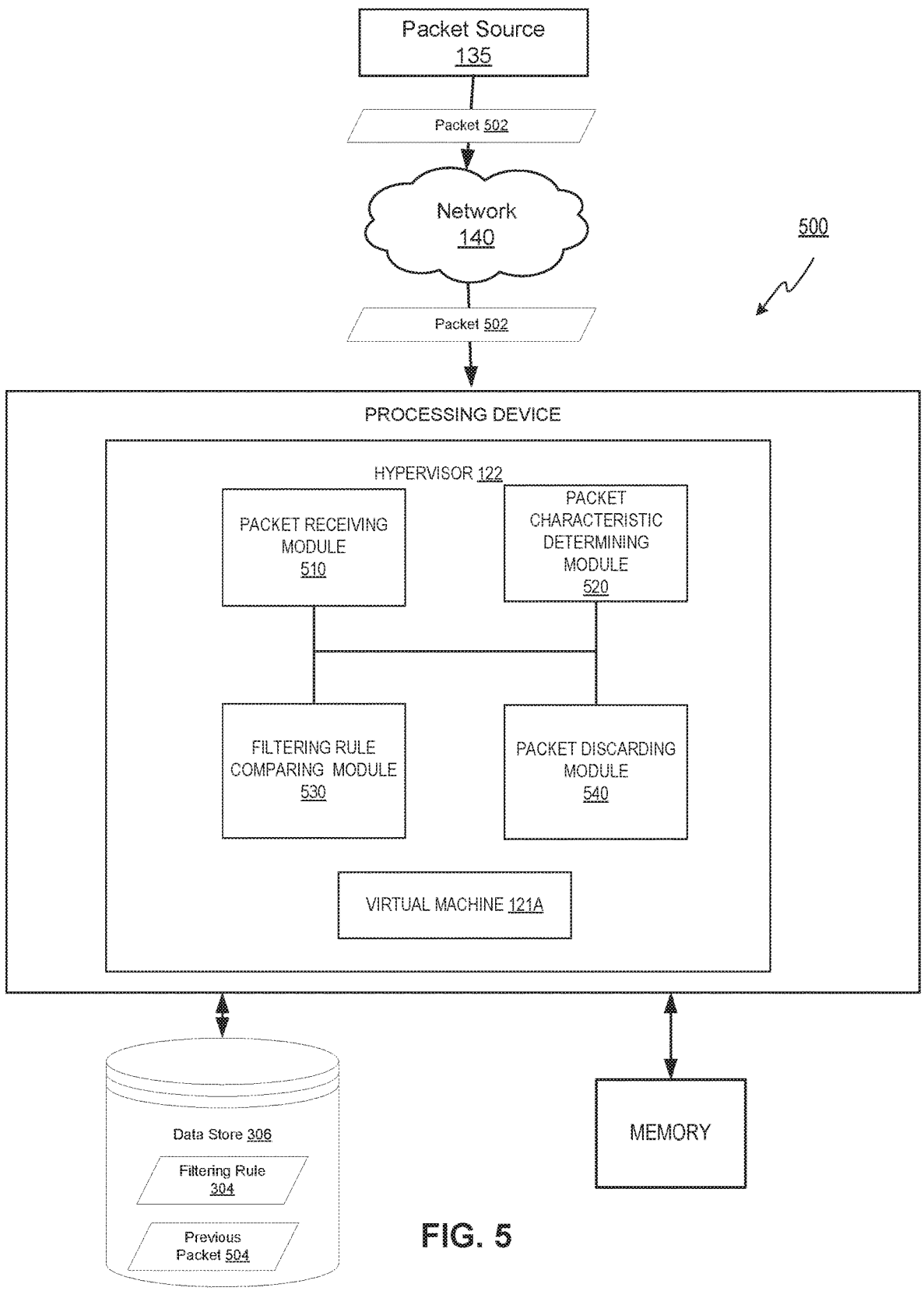
FIG. 5 depicts a block diagram of an example computer system for performing the method of FIG. 3, in accordance with one or more aspects of the present disclosure.

FIG. 5 depicts a block diagram of an example computer system 500 for performing the method of FIG. 4, in accordance with one or more aspects of the present disclosure. Computer system 500 may be the same or similar to the host 120 and may include one or more processing devices and one or more memory devices. In the example shown, computer system 500 may include packet receiving module 510, packet characteristic determining module 520, filtering rule comparing module 530, and packet discarding module 540. Also, as depicted, computer system 500 may be communicatively coupled to the data store 306 and the computer system 500 may be communicatively coupled to the packet source 135 via the network 140.

The packet receiving module 510 may receive a packet 502 that is addressed to the virtual machine 121A. The packet 502 may be sent from the packet source 135 via the network 140. The computer system 500 may receive the packet 502 at the physical NIC 129 and the physical NIC 129 may forward the packet 502 to the hypervisor 122. In some instances, the packet 502 may be addressed to an application 126A on the virtual machine 121A.

The packet characteristic determining module 520 may determine one or more characteristics of the packet 502. The packet characteristic determining module 520 may inspect the packet to identify the characteristics, such as the source address of the packet 502 (e.g., address of the packet source 135), data types included in the packet 502, format of the packet 502, data content in the packet 502, and the like.

The filtering rule comparing module 530 may compare the one or more characteristics with a filtering rule 304 created in view of a previous packet 504 determined to be malicious by the virtual machine 121A. The filtering rule comparing module 530 may access the data store 306 where the filtering rule 304 is stored and compare the characteristics of the previous packet 504 determined to be malicious with the characteristics of the packet 502.

The packet discarding module 540 may, responsive to a determination that the one or more characteristics match the filtering rule 304, discard the packet 502. In some implementations, the packet discarding module 540 may perform other filtering actions besides discarding, such as blocking the packet 502.

Figure 6:
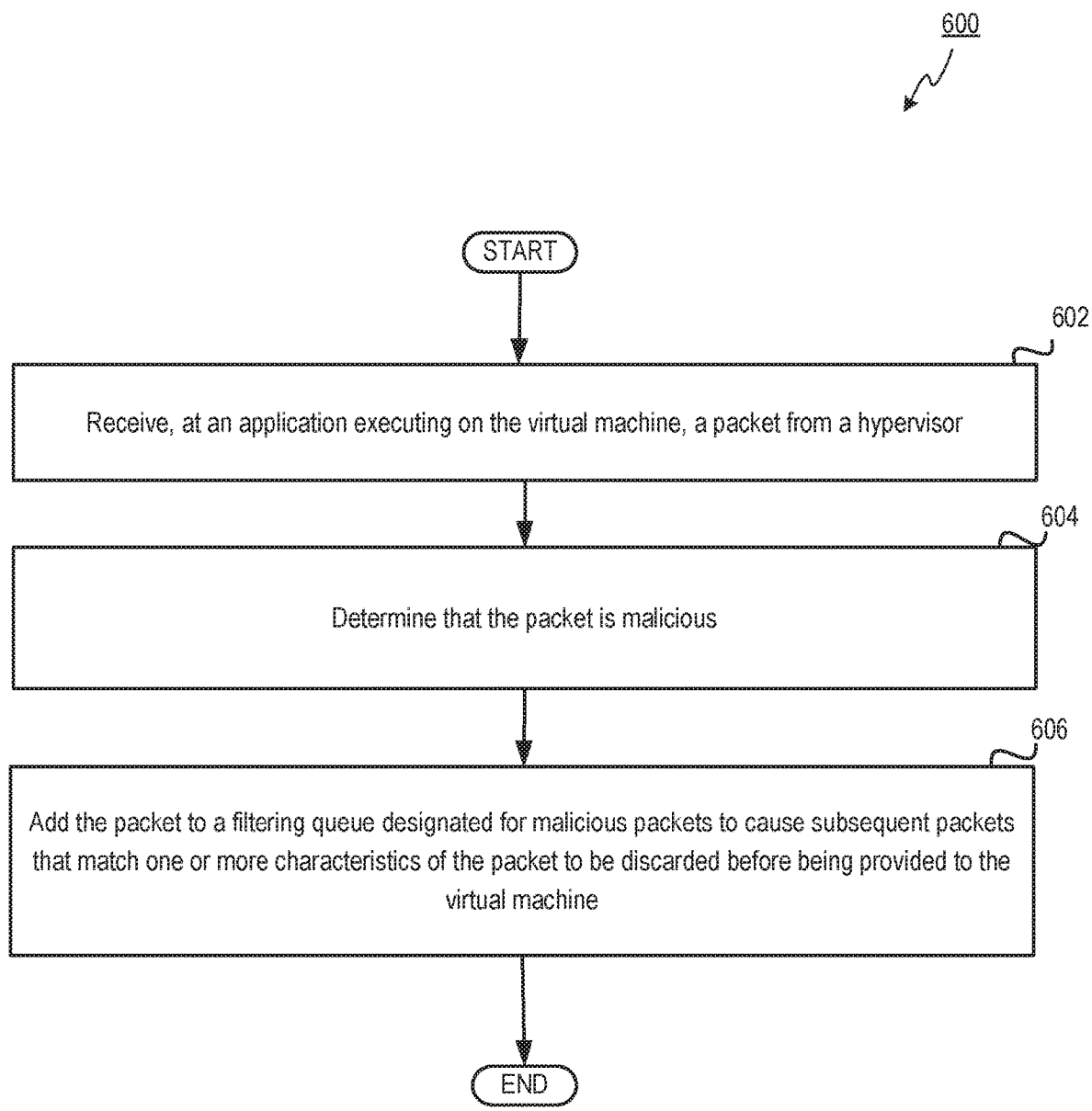
FIG. 6 depicts a flow diagram of an example method for a virtual machine adding a packet determined to be malicious to a filtering queue, in accordance with one or more aspects of the present disclosure.

FIG. 6 depicts a flow diagram of an example method 600 for a virtual machine 121A and/or 121B adding a packet determined to be malicious to a filtering queue 125A, in accordance with one or more aspects of the present disclosure. Method 600 includes operations performed by the host 120. Also, method 600 may be performed in the same or a similar manner as described above in regards to method 200. Method 600 may be performed by processing devices of the host 120 executing VM detecting component 127A and/or 127B of the virtual machines 121A and/or 121B. For clarity, the below discussion regarding the method 600 focuses on the VM detecting component 127A of the virtual machine 121A, but it should be understood that the method may be performed by the VM detecting component 127B of the virtual machine 121B, as well.

Method 600 may begin at block 602. At block 602, the processing device may receive, at an application 126A executing on the virtual machine 121A, a packet from the hypervisor 122. The packet may be sent from the packet source 135 over the network 140, and the packet may be received by the processing device via the physical NIC 129 that communicates with the network 140. The physical NIC 129 may have forwarded the packet to the hypervisor 122, and the hypervisor 122 may forward the packet to the application 126A on the virtual machine 121A. The packet may include a destination address of the application 126A.

At block 604, the processing device may determine that the packet is malicious. The processing device may use any suitable technique for determining whether the packet is malicious. For example, the processing device may look at patterns in the data of the packet to determine whether unexpected data is being used in the packet. The processing device may use machine learning that trains a model with malicious packets and uses the model to process the packet and predict whether the packet is malicious. In an implementation, the processing device may add metadata to the packet determined to be malicious prior to adding the packet to the filtering queue 125A. The metadata may include at least a type of malicious packet, the source address of the sender of the packet, and the like.

At block 606, the processing device may add the packet determined to be malicious to the filtering queue 125A designated for malicious packets to cause subsequent packets that match one or more characteristics of the packet to be discarded before being provided to the virtual machine 121A. As discussed above, in an implementation the filtering queue 125A may be located in the virtual NIC 124A of the virtual machine 121A.

In an implementation, to regulate the flow of packets to the hypervisor via the filtering queue 125A, the processing device may store packets determined to be malicious in a data store of the virtual machine 121A. Responsive to determining that a number of packets in the data store exceeds a threshold, the processing device may add the packets in the data store to the filtering queue 125A. In some instances, the threshold may be an 8-bit counter that tracks how many packets have accumulated in the data store.

Figure 7:
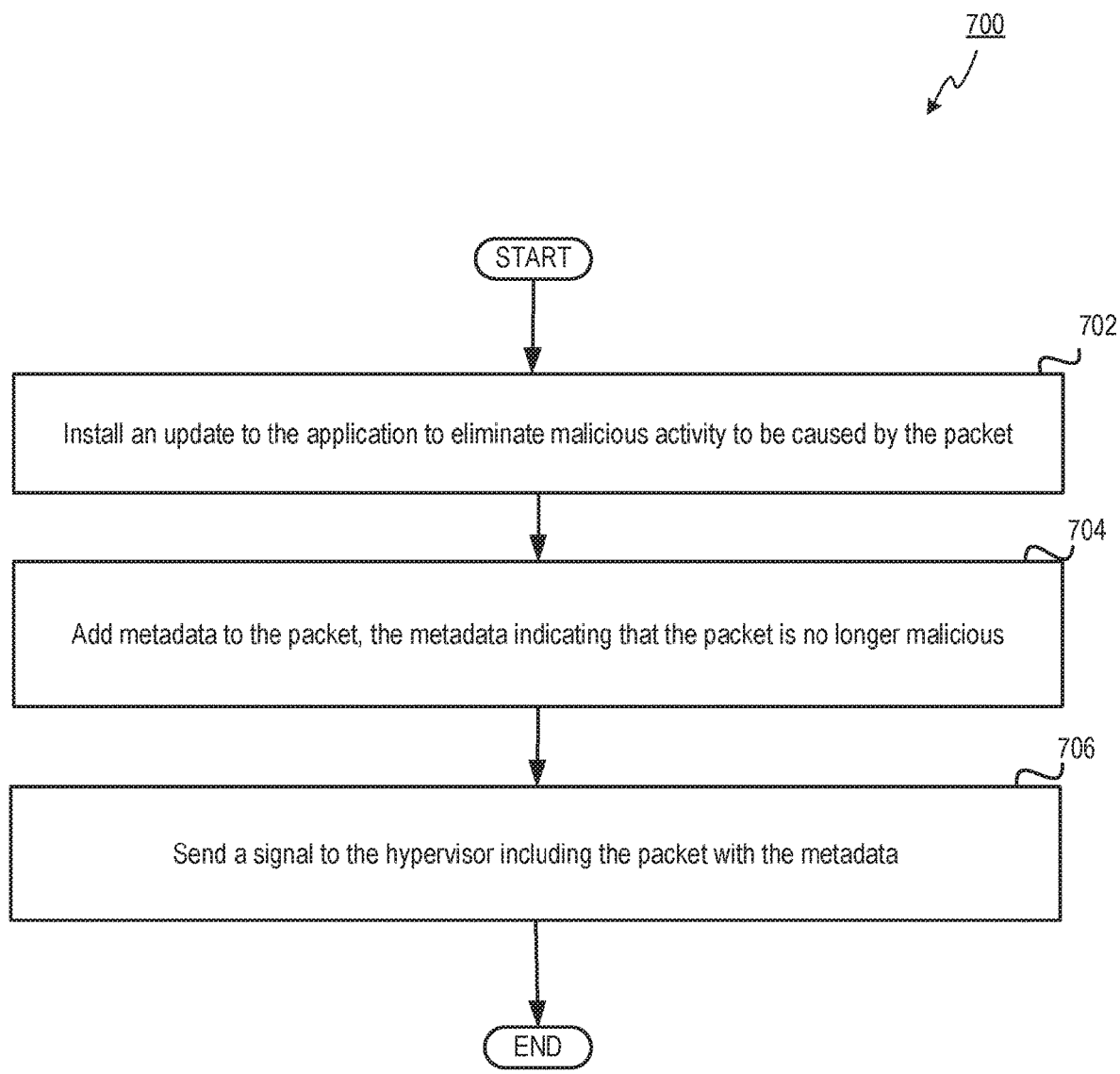
FIG. 7 depicts a flow diagram of an example method for a virtual machine sending a signal indicating that a packet is no longer malicious to a hypervisor, in accordance with one or more aspects of the present disclosure.

FIG. 7 depicts a flow diagram of an example method 700 for a virtual machine 121A sending a signal indicating that a packet is no longer malicious to a hypervisor 122, in accordance with one or more aspects of the present disclosure. Method 700 includes operations performed by the host 120. Also, method 700 may be performed in the same or a similar manner as described above in regards to method 200. Method 700 may be performed by processing devices of the host 120 executing VM detecting component 127A and/or 127B of the virtual machines 121A and/or 121B. For clarity, the below discussion regarding the method 700 focuses on the VM detecting component 127A of the virtual machine 121A, but it should be understood that the method may be performed by the VM detecting component 127B of the virtual machine 121B, as well.

Method 700 may begin at block 702. At block 702, the processing device installs an update to the application 126A to eliminate malicious activity to be caused by the packet. The update may be a patch or one or more files including computer instructions received by the application 126A via the network 140 (e.g., downloaded via the Internet).

At block 704, the processing device may add metadata to the packet that was previously determined to be malicious. The metadata may indicate that the packet is no longer malicious.

At block 706, the processing device may send a signal to the hypervisor 122 including the packet with the metadata. The signal may cause the hypervisor 122 to disable a filtering rule updated with the packet previously determined to be malicious and/or update one or more models used to match characteristics of packets for the filtering rules.

Figure 8:
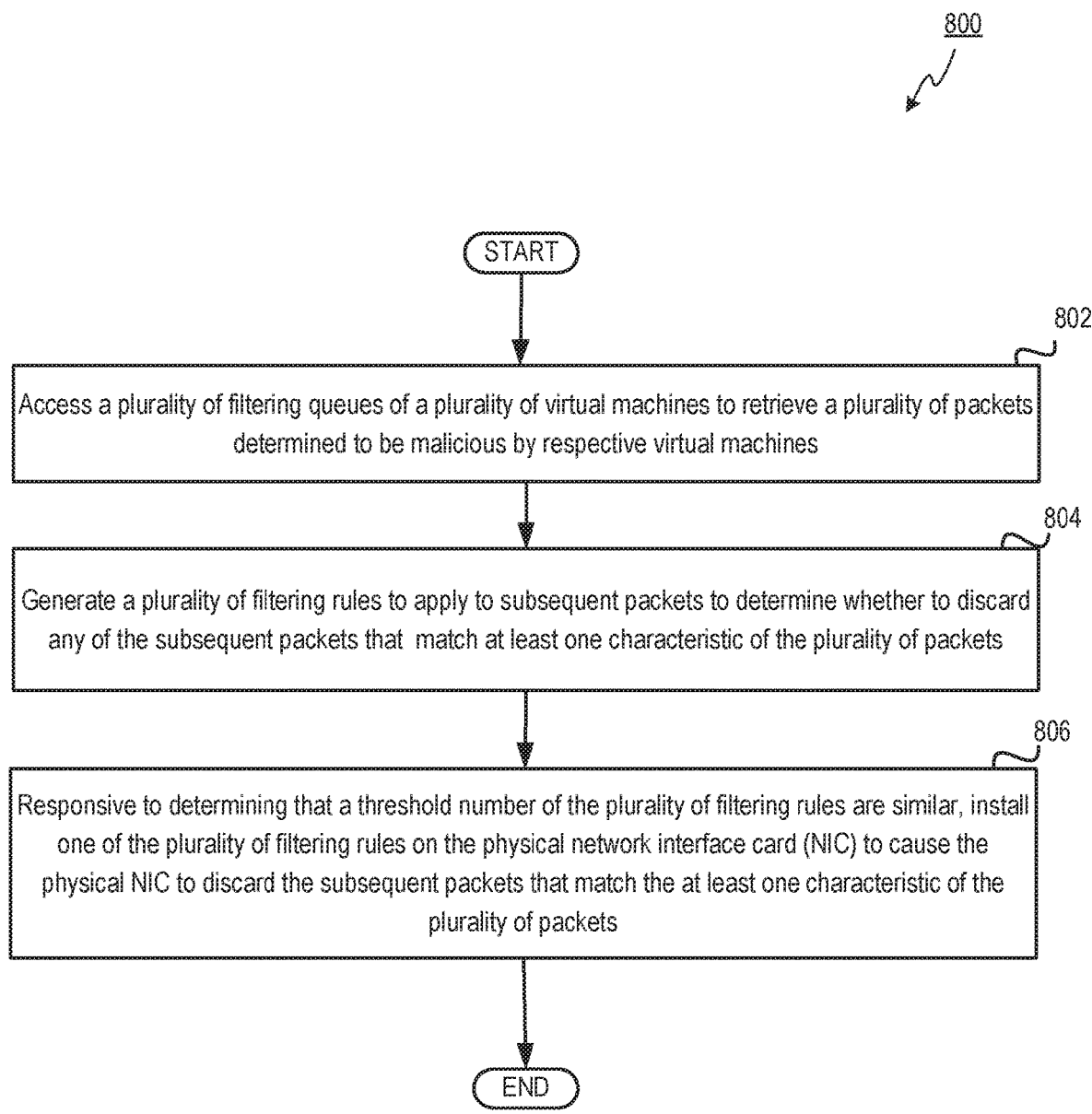
FIG. 8 depicts a flow diagram of an example method for a hypervisor installing a filtering rule on a physical network interface card (NIC), in accordance with one or more aspects of the present disclosure.

FIG. 8 depicts a flow diagram of an example method 800 for a hypervisor 122 installing a filtering rule on a physical network interface card (NIC) 129, in accordance with one or more aspects of the present disclosure. Method 800 includes operations performed by the host 120. Also, method 800 may be performed in the same or a similar manner as described above in regards to method 200. Method 800 may be performed by processing devices of the host 120 executing HV filtering component 128 of the hypervisor 122.

Method 800 may begin at block 802. At block 802, the processing device may access a plurality of filtering queues (e.g., 125A and 125B) of virtual machines (e.g., 121A and 121B) to retrieve a plurality of packets determined to be malicious by respective virtual machines. The plurality of filtering queues 125A and 125B may be designated for packets that are determined to be malicious by the VM detecting components 127A and 127B. Further, each of the plurality of filtering queues 125A and 125B may be located in the virtual NICs 124A and 124B of the respective virtual machines 121A and 121B.

In an implementation, applications 126A and 126B on each of the plurality of virtual machines 121A and 121B flag a respective packet of the plurality of packets as malicious and adds the respective packet to a respective filtering queue 125A and 125B. Prior to adding the packets to the filtering queues 125A and 125B, the applications 126A and 126B may include metadata (e.g., type of malicious packet, source address of the packet, etc.) in the respective packet.

At block 804, the processing device may generate a plurality of filtering rules to apply to subsequent packets to determine whether to discard any of the subsequent packets that match at least one characteristic of the plurality of packets. The plurality of filtering rules may be stored in the data store 306.

At block 806, responsive to determining that a threshold number of the plurality of filtering rules are similar, the processing device may install one of the plurality of filtering rules on the physical NIC 129 to cause the physical NIC 129 to discard the subsequent packets that match the at least one characteristic of the plurality of packets. Additionally or alternatively, the processing device may determine that the characteristics of the packets retrieved from the filtering queues 125A and 125B are similar and may generate a single rule that is then installed on the physical NIC 129. The physical NIC 129 may receive a packet subsequently to the filtering rule being installed on the physical NIC 129. Responsive to determining that the subsequent packet matches the at least one characteristic of the plurality of packets, the processing device may apply the rule to discard the subsequent packet.

In an implementation, the processing device may disable (e.g., remove, temporarily suspend) the filtering rule from the physical NIC 129 after a predefined time period. The processing device may receive subsequent packets that match characteristics in the disabled filtering rule from the physical NIC 129. Further, the processing device may send the subsequent packets to the plurality of virtual machines 121A and 121B to facilitate determinations of whether the subsequent packets are malicious.

Figure 9:
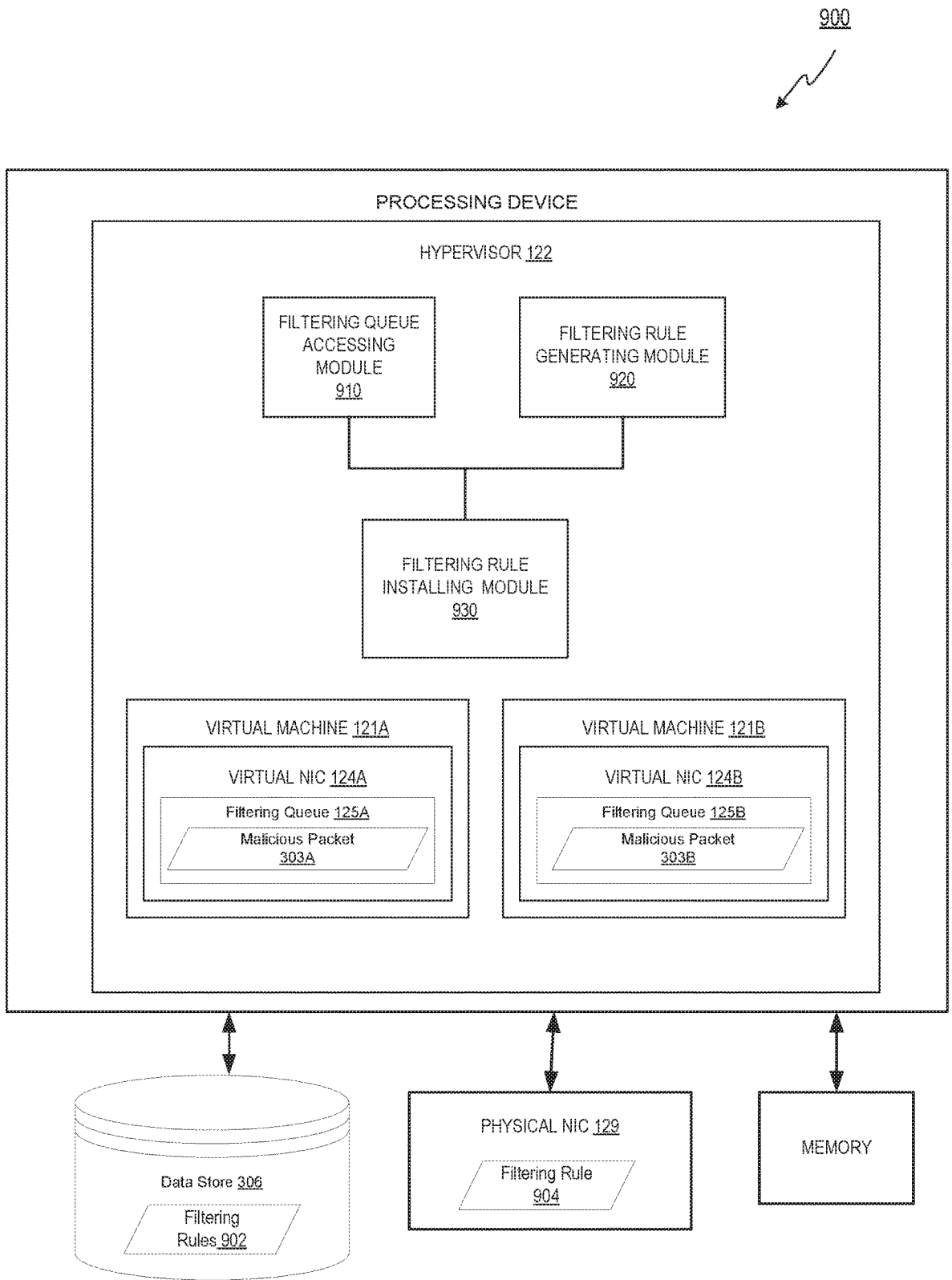
FIG. 9 depicts a block diagram of an example computer system for performing the method of FIG. 8, in accordance with one or more aspects of the present disclosure.

FIG. 9 depicts a block diagram of an example computer system 900 for performing the method of FIG. 8, in accordance with one or more aspects of the present disclosure. Computer system 900 may be the same or similar to the host 120 and may include one or more processing devices and one or more memory devices. In the example shown, computer system 900 may include filtering queue accessing module 910, filtering rule generating module 920, and filtering rule installing module 930. Also, as depicted, computer system 900 may be communicatively coupled to the data store 306 and the physical NIC 129.

The filtering queue accessing module 510 may access a plurality of filtering queues of virtual machines to retrieve a plurality of packets determined to be malicious by respective virtual machines. For example, as depicted, the filtering queue accessing module 510 may access filtering queue 125A and 125B to retrieve packets 303A and 303B determined to be malicious by respective virtual machine 121A and 121B.

The filtering rule generating module 920 may generate a plurality of filtering rules 902 to apply to subsequent packets to determine whether to discard any of the subsequent packets that match at least one characteristic of the plurality of packets. The plurality of filtering rules 902 may be stored in the data store 306.

The filtering rule installing module 930 may, responsive to determining that a threshold number of the plurality of filtering rules 902 are similar, the processing device may install one of the plurality of filtering rules (e.g., filtering rule 904) on the physical NIC 129 to cause the physical NIC 129 to discard the subsequent packets that match the at least one characteristic of the plurality of packets 303A and 303B. Additionally or alternatively, the filtering rule installing module 930 may determine that the characteristics of the packets retrieved from the filtering queues 125A and 125B are similar and may generate a single rule 904 that is then installed on the physical NIC 129.

Figure 10:
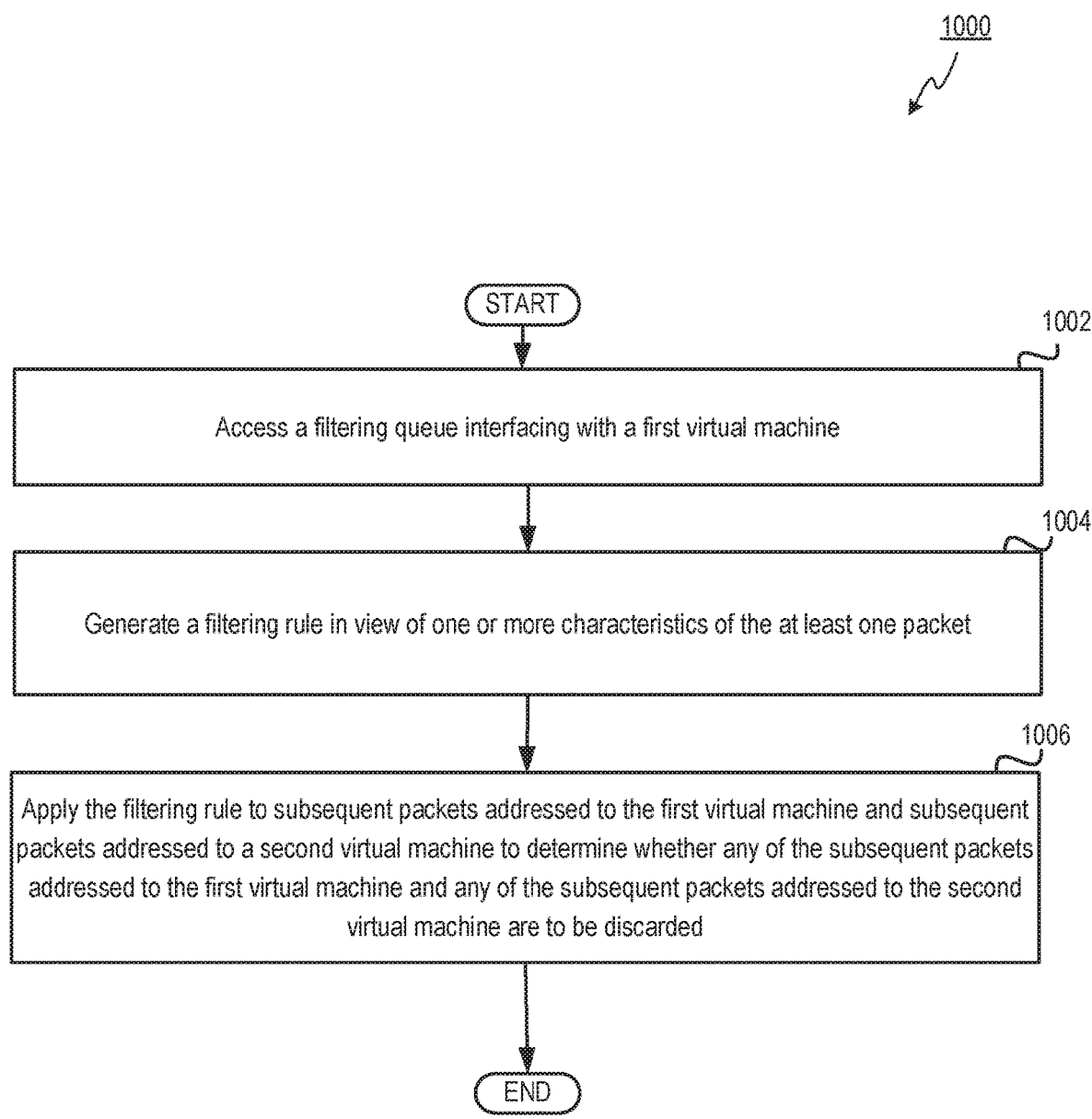
FIG. 10 depicts a flow diagram of an example method for a hypervisor applying a filtering rule to a first virtual machine and a second filtering machine, in accordance with one or more aspects of the present disclosure.

FIG. 10 depicts a flow diagram of an example method 1000 for a hypervisor 122 applying a filtering rule to a first virtual machine 121A and a second filtering machine 121B, in accordance with one or more aspects of the present disclosure. Method 1000 includes operations performed by the host 120. Also, method 1000 may be performed in the same or a similar manner as described above in regards to method 200. Method 1000 may be performed by processing devices of the host 120 executing HV filtering component 128 of the hypervisor 122.

Method 1000 may begin at block 1002. At block 1002, the processing device may access a filtering queue 125A interfacing with a first virtual machine 121A. In an implementation, the filtering queue 125A may be located in the virtual NIC 124A of the first virtual machine 121A and the filtering queue 125A may provide a channel between the hypervisor 122 and the virtual machine 121A for forwarding malicious packets from the virtual machine 121A to the hypervisor 122.

At block 1004, the processing device may generate a filtering rule in view of one or more characteristics of the at least one packet. At block 1006, the processing device may apply the filtering rule to subsequent packets addressed to the first virtual machine 121A and subsequent packets addressed to a second virtual machine 121B to determine whether any of the subsequent packets addressed to the first virtual machine 121A and any of the subsequent packets addressed to the second virtual machine 121B are to be discarded. In an implementation, the first virtual machine 121A and the second virtual machine 121B satisfy a trust condition that verifies whether the first virtual machine 121A and the second virtual machine 121B are owned by the same user, for example.

Figure 11:
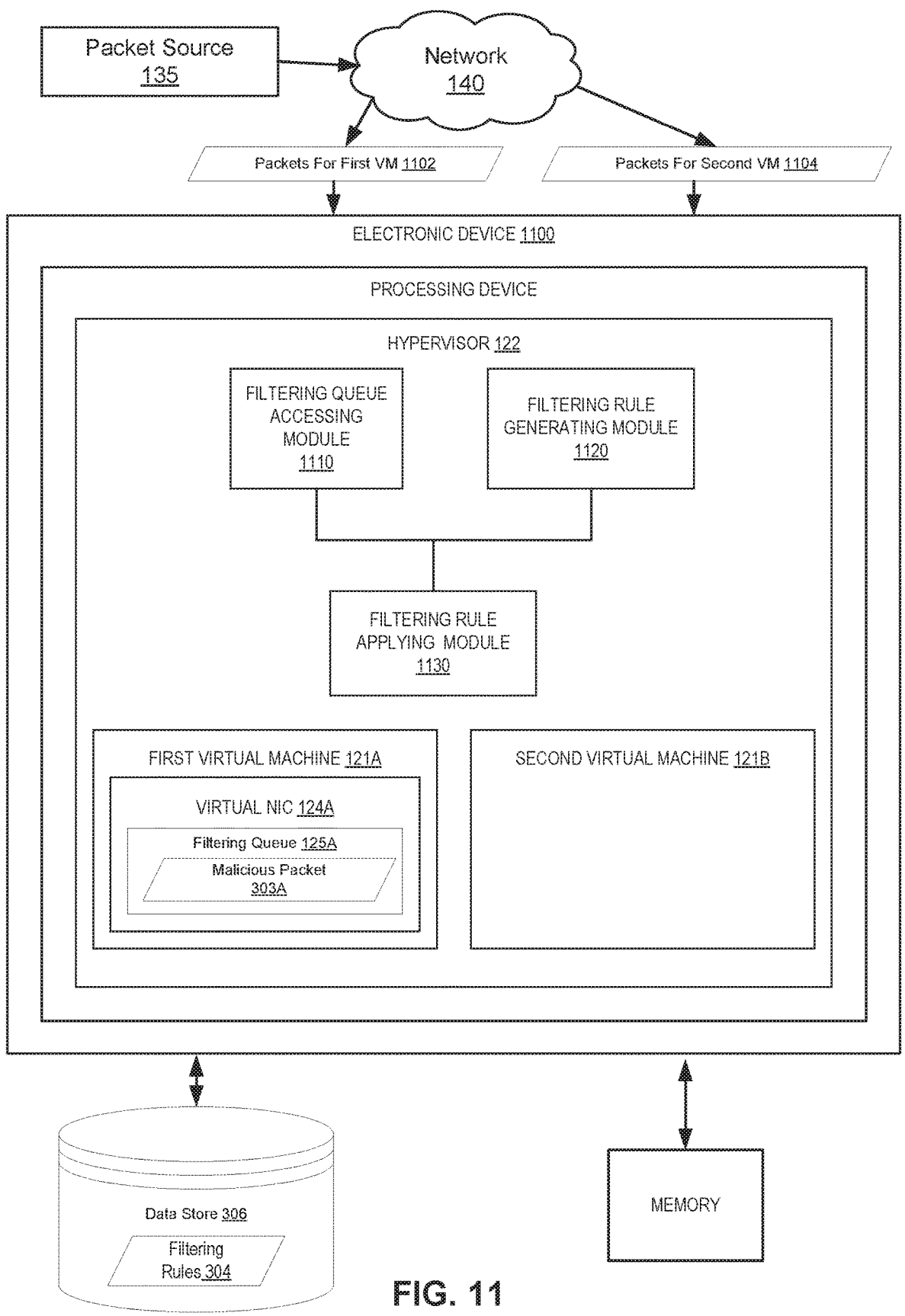
FIG. 11 depicts a block diagram of an example electronic device for performing the method of FIG. 10, in accordance with one or more aspects of the present disclosure.

FIG. 11 depicts a block diagram of an example electronic device 1100 for performing the method of FIG. 10, in accordance with one or more aspects of the present disclosure. Electronic device 1100 may be the same or similar to the host 120 and may include one or more processing devices and one or more memory devices. In the example shown, computer system 1100 may include filtering queue accessing module 1110, filtering rule generating module 1120, and filtering rule applying module 1130. Also, as depicted, electronic device 1100 may be communicatively coupled to the data store 306, and the electronic device 1100 may be communicatively coupled to the packet source 135 via the network 140. As depicted, the hypervisor 122 may be executing the first virtual machine 121A and the second virtual machine 121B.

The filtering queue accessing module 510 may access the filtering queue 125A of the first virtual machine 121A. The filtering queue 125A may store at least one packet 303A determined to be malicious by the VM detecting component 127A. The filtering queue accessing module 510 may retrieve the packet 303A from the filtering queue 125A.

The filtering rule generating module 1120 may generate a filtering rule 304 in view of one or more characteristics of the at least one packet 303A and the filtering rule 304 may be stored in the data store 306.

The filtering rule apply module 1130 may apply the filtering rule 304 to subsequent packets 1102 addressed to the first virtual machine 121A and subsequent packets 1104 addressed to the second virtual machine 121B to determine whether any of the subsequent packets 1102 addressed to the first virtual machine 121A and any of the subsequent packets 1104 addressed to the second virtual machine 121B are to be discarded. As discussed above, the first virtual machine 121A and the second virtual machine 121B may satisfy a trust condition before applying the filtering rule 304 to any packets addressed to the second virtual machine 121B. The packets 1102 and 1104 may be sent from the packet source 135. In another example, the packets 1102 and 1104 may be sent from different sources.

Figure 12:
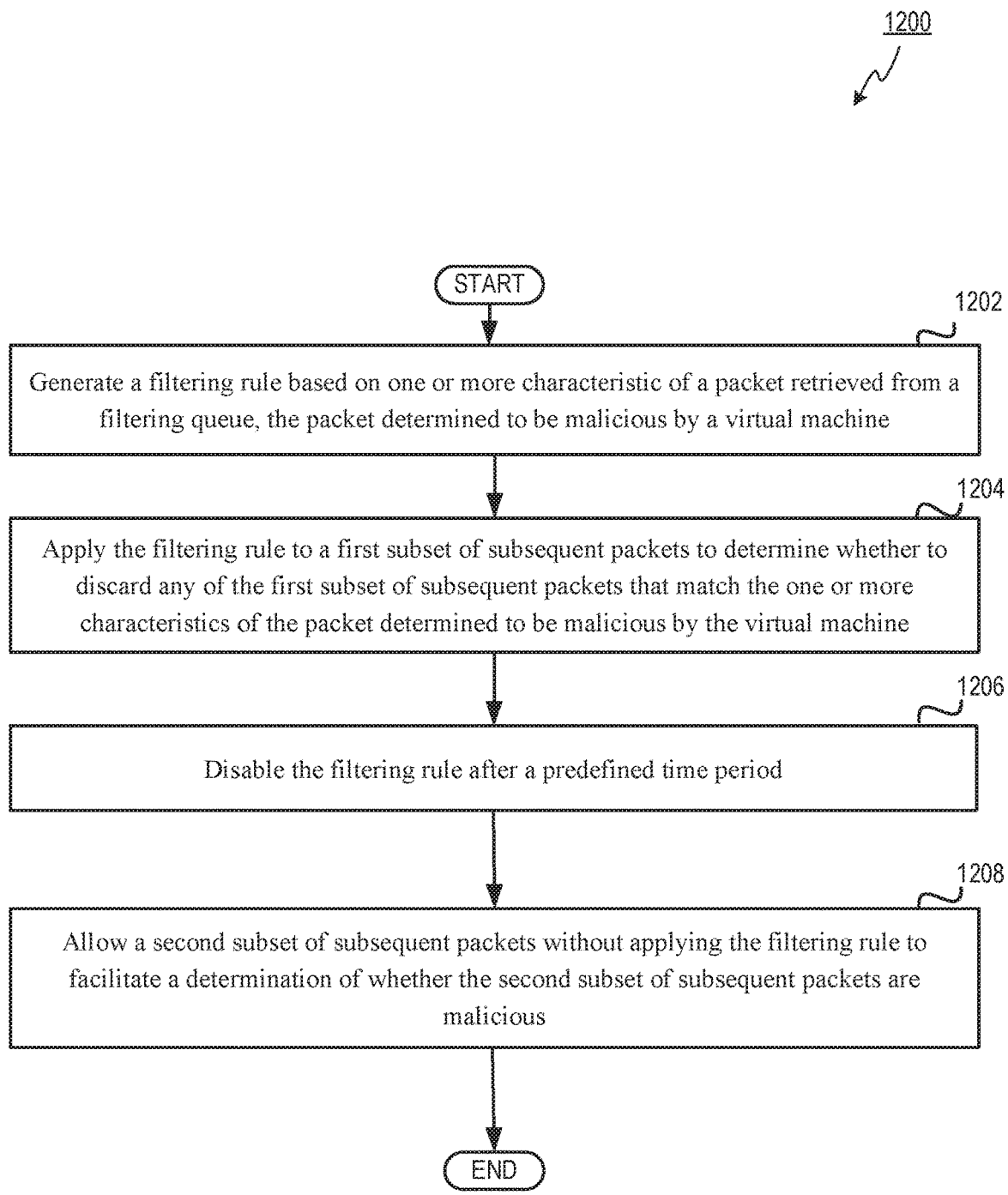
FIG. 12 depicts a flow diagram of an example method for a hypervisor disabling a filtering rule to facilitate determine of whether packets are malicious, in accordance with one or more aspects of the present disclosure.

FIG. 12 depicts a flow diagram of an example method 1200 for a hypervisor 122 applying a filtering rule to a first virtual machine 121A and a second filtering machine 121B, in accordance with one or more aspects of the present disclosure. Method 1200 includes operations performed by the host 120. Also, method 1200 may be performed in the same or a similar manner as described above in regards to method 200. Method 1200 may be performed by processing devices of the host 120 executing HV filtering component 128 of the hypervisor 122.

Method 1200 may begin at block 1202. At block 1202, the processing device may generate a filtering rule in view of one or more characteristics of a packet retrieved from the filtering queue 125A. The packet may be determined to be malicious by the virtual machine 121A (e.g., VM detecting component 127A). At block 1204, the processing device may apply the filtering rule to a first subset of subsequent packets to determine whether to discard any of the first subset of subsequent packets that match the one or more characteristics of the packet determined to be malicious by the virtual machine 121A.

At block 1206, the processing device may disable the filtering rule after a predefined time period. For example, disabling the filtering rule may refer to removing the filtering rule or temporarily disabling the filtering rule. In instances where the filtering rule is temporarily disabled, the filtering rule may be reactivated after another predefined time period.

At block 1208, the processing device may allow a second subset of subsequent packets without applying the filtering rule to facilitate a determination of whether the second subset of subsequent packets are malicious. In some instances, the virtual machine 121A may determine that the packets are not malicious. If the packets are determined to no longer be malicious, the virtual machine 121A may send a signal to the hypervisor indicating such. If the packets are determined to be malicious, the virtual machine 121A may add the malicious packet to the filtering queue 125A and the hypervisor 122 may generate another filtering rule or reactivate the previously disabled filtering rule.

Figure 13:
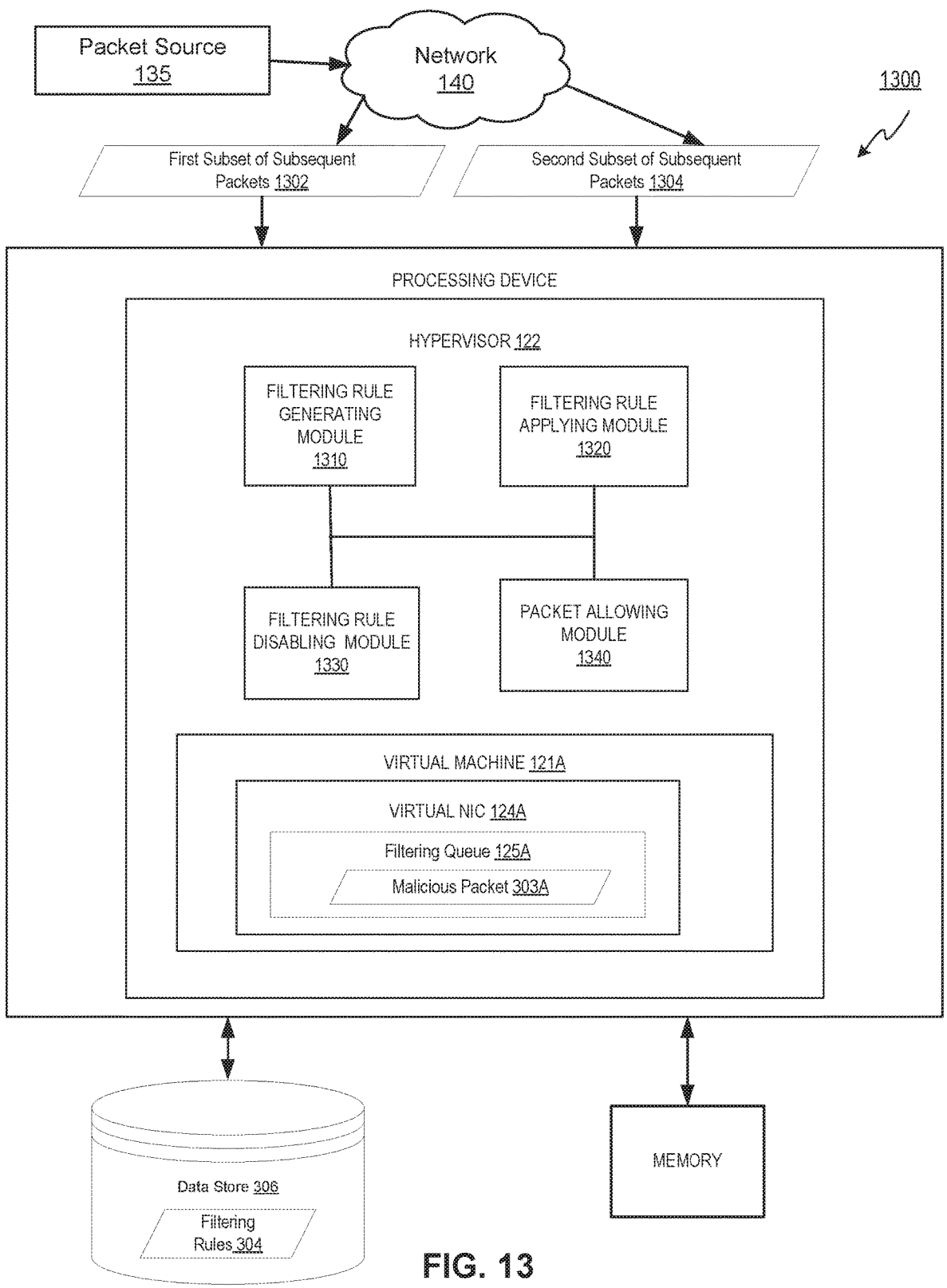
FIG. 13 depicts a block diagram of an example computer system for performing the method of FIG. 12, in accordance with one or more aspects of the present disclosure.

FIG. 13 depicts a block diagram of an example computer system 1300 for performing the method of FIG. 12, in accordance with one or more aspects of the present disclosure. Computer system 1300 may be the same or similar to the host 120 and may include one or more processing devices and one or more memory devices. In the example shown, computer system 1300 may include filtering rule generating module 1310, filtering rule applying module 1320, filtering rule disabling module 1330, and packet allowing module 1340. Also, as depicted, computer system 1300 may be communicatively coupled to the data store 306 and the computer system 1300 may be communicatively coupled to the packet source 135 via the network 140. In some instances, the packet source 135 may include one or more networking components (e.g., servers).

The filtering rule generating module 1310 may generate a filtering rule 304 in view of one or more characteristics of a packet 303A retrieved from the filtering queue 125A. The packet 303A may be determined to be malicious by the virtual machine 121A (e.g., VM detecting component 127A). The filtering rule 304 may be stored in the data store 306.

The filtering rule applying module 1320 may apply the filtering rule 304 to a first subset of subsequent packets 1302 to determine whether to discard any of the first subset of subsequent packets 1302 that match the one or more characteristics of the packet 303A determined to be malicious by the virtual machine 121A.

The filtering rule disabling module 1330 may disable the filtering rule 303A after a predefined time period. For example, the filtering rule disabling module 1330 may remove or temporarily suspend the filtering rule 303A associated with the malicious packet 303A.

The packet allowing module 1340 may allow a second subset of subsequent packets 1304 without applying the filtering rule 304 to facilitate a determination of whether the second subset of subsequent packets 1304 are malicious. In some instances, the virtual machine 121A may determine that the packets are not malicious. If the packets are determined to no longer be malicious, the virtual machine 121A may send a signal to the hypervisor 122 indicating such. In an implementation where the filtering rule has been temporarily suspended, the signal may enable the hypervisor 122 to remove the filtering rule such that it is not reactivated to filter the packets that are no longer malicious. However, it should be noted that the signal may not be sent in some implementations where the filtering rule has been temporarily suspended.

In other implementations, when the filtering rule 304 has been removed, the virtual machine 121A may not provide a signal to the hypervisor 122 because the filtering rule 304 has already been removed. However, it should be understood that the signal may also be sent in instances where the filtering rule has been removed to enable the hypervisor to improve its filtering techniques. If the packets are determined to be malicious, the virtual machine 121A may add the malicious packet to the filtering queue 125A and the hypervisor 122 may generate another filtering rule or reactivate the previously disabled filtering rule.

Figure 14:
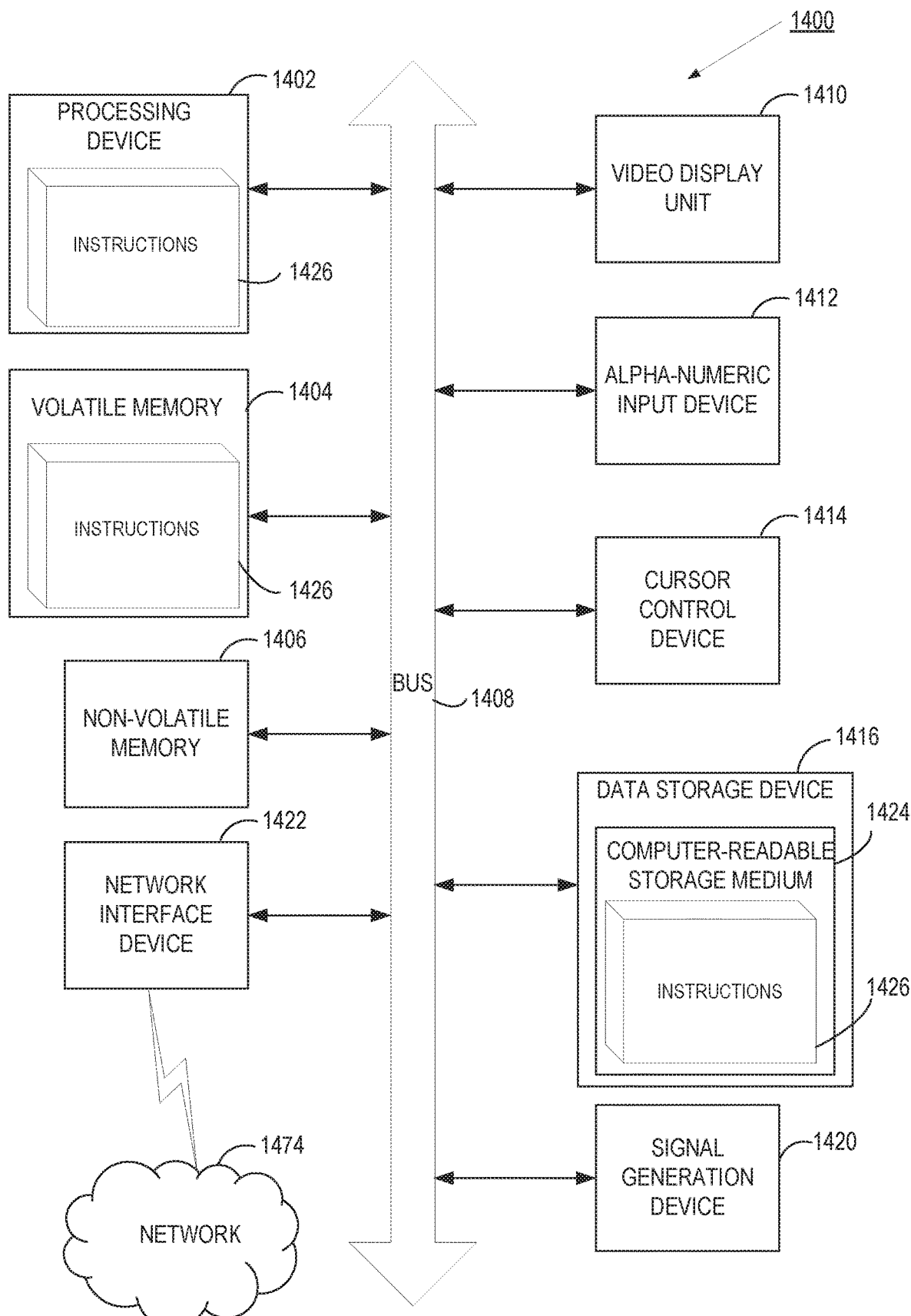
FIG. 14 depicts a block diagram of an illustrative computing device operating in accordance with the examples of the present disclosure.

FIG. 14 depicts a block diagram of a computer system operating in accordance with one or more aspects of the present disclosure. In various illustrative examples, computer system 1400 may correspond to a computing device within system architecture 100 of FIG. 1. In one implementation, the computer system 1400 may be the host 120. The computer system 1400 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 1400 may be connected (e.g., via a network, such as a Local Area Network (LAN), an intranet, an extranet, or the Internet) to other computer systems. Computer system 1400 may operate in the capacity of a server or a client computer in a client-server environment, or as a peer computer in a peer-to-peer or distributed network environment. Computer system 1400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1400 may include a processing device 1402, a volatile memory 1404 (e.g., random access memory (RAM)), a non-volatile memory 1406 (e.g., read-only memory (ROM) or electrically-erasable programmable ROM (EEPROM)), and a data storage device 1416, which may communicate with each other via a bus 1408.

Processing device 1402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1400 may further include a network interface device 1422. Computer system 1400 also may include a video display unit 1410 (e.g., an LCD), an alphanumeric input device 1412 (e.g., a keyboard), a cursor control device 1414 (e.g., a mouse), and a signal generation device 1420.

Data storage device 1416 may include a non-transitory computer-readable storage medium 1424 on which may store instructions 1426 encoding any one or more of the methods or functions described herein, including instructions implementing HV filtering component 128 of FIG. 1 for implementing methods 200, 400, 800, 1000, and 1200, and implementing VM detecting component 127A and 127B for implementing methods 600 and 700.

Instructions 1426 may also reside, completely or partially, within volatile memory 1404 and/or within processing device 1402 during execution thereof by computer system 1400, hence, volatile memory 1404 and processing device 1402 may also constitute machine-readable storage media.

While computer-readable storage medium 1424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, 600, 700, 800, 1000, and 1200, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method, comprising: accessing, by a hypervisor executing by a processing device, a filtering queue that stores at least one packet determined to be malicious by a virtual machine; generating, by the hypervisor, a filtering rule in view of characteristics of the at least one packet determined to be malicious; and storing the filtering rule in a data store to apply to subsequent packets addressed to the virtual machine to determine whether any of the subsequent packets have similar characteristics with the at least one packet determined to be malicious.

Example 2 is the method of Example 1, further comprising: receiving, by the hypervisor, a subsequent packet addressed to the virtual machine; and in response to determining that the subsequent packet has similar characteristics with the at least one packet determined to be malicious, discarding the subsequent packet.

Example 3 is the method of Example 1, further comprising applying the filtering rule to packets addressed to a second virtual machine that satisfies a trust condition with the virtual machine, the trust condition verifying whether the virtual machine and the second virtual machine belong to a same user.

Example 4 is the method of Example 1, further comprising: accessing, by the hypervisor, a second filtering queue of a second virtual machine, the second filtering queue storing at least a second packet determined to be malicious by the second virtual machine; generating, by the hypervisor, a second filtering rule in view of characteristics of the second packet determined to be malicious; and in response to determining that the filtering rule and the second filtering rule match, installing the filtering rule in a physical network interface card (NIC) to apply to packets at the physical NIC to determine whether any of the packets have similar characteristics with the at least one packet and the second packet determined to be malicious.

Example 5 is the method of Example 1, further comprising: accessing, by the hypervisor, a second filtering queue of a second virtual machine, the second filtering queue storing at least a second packet determined to be malicious by the second virtual machine, wherein the first virtual machine and the second virtual machine do not satisfy a trust condition; generating, by the hypervisor, a second filtering rule in view of characteristics of the second packet determined to be malicious; and in response to determining that the filtering rule and the second filtering rule match, storing the filtering rule in a data store to apply to subsequent packets addressed to the virtual machine and the second virtual machine to determine whether any of the subsequent packets have similar characteristics with the at least one packet and the second packet determined to be malicious.

Example 6 is the method of Example 1, wherein the filtering queue is designated for packets flagged as malicious.

Example 7 is the method of Example 1, wherein the filtering queue is in a virtual network interface card (NIC) of the virtual machine.

Example 8 is the method of Example 1, further comprising: removing, by the hypervisor, the filtering rule after a predefined time period; and transmitting the subsequent packets to the virtual machine to facilitate determination of whether the subsequent packets are malicious.

Example 9 is the method of Example 1, further comprising: temporarily suspending, by the hypervisor, the filtering rule for a set period of time; and sending the subsequent packets to the virtual machine to facilitate determination of whether the subsequent packets are malicious while the filtering rule is temporarily suspended.

Example 10 is the method of Example 1, further comprising: adding metadata included with the packet to the filtering rule when the filtering rule is generated, the metadata comprising a type of malicious packet; and logging the discarding of any of the subsequent packets and the metadata in an event log.

Example 11 is the method of Example 1, further comprising receiving, from the virtual machine, a signal comprising the packet and metadata included with the packet by the virtual machine, the metadata providing an indication that the packet is no longer flagged as malicious by the virtual machine.

Example 12 is the method of claim 1, wherein an application on the virtual machine flags the packet as being malicious and adds the packet to the filtering queue.

Example 13 is a system, comprising: a memory; a processing device coupled to the memory, the processing device executing a hypervisor to: receive a packet that is addressed to a virtual machine; determine one or more characteristics of the packet; compare the one or more characteristics with a filtering rule created in view of a previous packet determined to be malicious by the virtual machine; and responsive to a determination that the one or more characteristics match the filtering rule, discard the packet.

Example 14 is the system of Example 13, wherein the processing device further executes the hypervisor to, responsive to a determination that the one or more characteristics do not match the filtering rule, transmit the packet to the virtual machine.

Example 15 is the system of Example 13, wherein the filtering rule was created in view of the previous packet by accessing a filtering queue of the virtual machine to retrieve the previous packet, the filtering queue designated for packets determined to be malicious.

Example 16 is the system of Example 13, wherein the processing device further executes the hypervisor to: remove the filtering rule after a predefined time period; receive a subsequent packet addressed to the virtual machine; and transmit the subsequent packet to the virtual machine without determining whether one or more characteristics of the subsequent packet match the filtering rule.

Example 17 is one or more tangible, non-transitory computer-readable media storing instructions that, when executed, cause one or more processing devices executing a virtual machine to: receive, at an application executing on the virtual machine, a packet from a hypervisor; determine that the packet is malicious; and add the packet to a filtering queue designated for malicious packets to cause subsequent packets that match one or more characteristics of the packet to be discarded before being provided to the virtual machine.

Example 18 is the computer-readable media of Example 17, wherein the one or more processing devices executing the virtual machine are further to: add metadata to the packet prior to adding the packet to the filtering queue, the metadata including at least a type of malicious packet.

Example 19 is the computer-readable media of Example 17, wherein the one or more processing devices executing the virtual machine are further to: install an update to the application to eliminate malicious activity to be caused by the packet; add metadata to the packet, the metadata indicating that the packet is no longer malicious; and send a signal to the hypervisor including the packet with the metadata.

Example 20 is the computer-readable media of Example 17, wherein the one or more processing devices executing the virtual machine are further to: store packets determined to be malicious in a data store of the virtual machine; and responsive to determining that a number of packets in the data store exceeds a threshold, add the packets in the data store to the filtering queue.

Example 21 is the computer-readable media of Example 17, wherein the filtering queue is included in a virtual network interface card of the virtual machine.

Example 22 is a system, comprising: a physical network interface card; a memory; a processing device coupled to the memory and the physical network interface card, the processing device executing a hypervisor to: access a plurality of filtering queues of a plurality of virtual machines to retrieve a plurality of packets determined to be malicious by respective virtual machines; generate a plurality of filtering rules to apply to subsequent packets to determine whether to discard any of the subsequent packets that match at least one characteristic of the plurality of packets; and responsive to determining that a threshold number of the plurality of filtering rules are similar, install one of the plurality of filtering rules on the physical network interface card (NIC) to cause the physical NIC to discard the subsequent packets that match the at least one characteristic of the plurality of packets.

Example 23 is the system of Example 22, wherein the physical network interface card to: receive a subsequent packet; and responsive to determining that the subsequent packet matches the at least one characteristic of the plurality of packets, apply the rule to discard the subsequent packet.

Example 24 is the system of Example 22, wherein the plurality of filtering queues are designated for packets flagged as malicious.

Example 25 is the system of Example 22, wherein the plurality of filtering queues are each located in a virtual NIC of a respective virtual machine.

Example 26 is the system of Example 22, wherein an application on each of the plurality of virtual machines flags a respective packet of the plurality of packets as malicious and adds the respective packet to a respective filtering queue of the plurality of filtering queues.

Example 27 is the system of Example 26, wherein the application includes metadata in the respective packet prior to adding the respective packet to the respective filtering queue, the metadata indicating at least a type of malicious packet.

Example 28 is the system of Example 22, wherein the processing device further executes the hypervisor to: remove the filtering rule from the physical network interface card after a predefined time period; receive the subsequent packets from the physical network interface card; and send the subsequent packets to the plurality of virtual machines to facilitate determinations of whether the subsequent packets are malicious.

Example 29 is an electronic device, comprising: a memory; a processing device coupled to the memory, the processing device executing a hypervisor to: access a filtering queue interfacing with a first virtual machine, the filtering queue designated for malicious packets and including at least one packet determined to be malicious by the first virtual machine; generate a filtering rule in view of one or more characteristics of the at least one packet; and apply the filtering rule to subsequent packets addressed to the first virtual machine and subsequent packets addressed to a second virtual machine to determine whether any of the subsequent packets addressed to the first virtual machine and any of the subsequent packets addressed to the second virtual machine are to be discarded.

Example 30 is the electronic device of Example 29, wherein the first virtual machine and the second virtual machine satisfy a trust condition that verifies whether the first virtual machine and the second virtual machine are owned by the same user.

Example 31 is the electronic device of Example 29, wherein the processing device executing the hypervisor further to: disable the filtering rule after a predefined time period; and allow the subsequent packets to be sent to the second virtual machine without applying the filtering rule.

Example 32 is the electronic device of Example 29, wherein the hypervisor is executing the first virtual machine and the second virtual machine.

Example 33 is the electronic device of Example 29, wherein the filtering queue is included in a virtual network interface card of the first virtual machine.

Example 34 is an apparatus for filtering malicious packets, comprising: means for generating a filtering rule based on one or more characteristic of a packet retrieved from a filtering queue, the packet determined to be malicious by a virtual machine; means for applying the filtering rule to a first subset of subsequent packets to determine whether to discard any of the first subset of subsequent packets that match the one or more characteristics of the packet determined to be malicious by the virtual machine; means for disabling the filtering rule after a predefined time period; and means for allowing a second subset of subsequent packets without applying the filtering rule to facilitate a determination of whether the second subset of subsequent packets are malicious.

Example 35 is the apparatus of Example 34, further comprising: means for generating a second filtering rule based on one or more characteristic of a second packet retrieved from a second filtering queue, the second packet determined to be malicious by a second virtual machine; and means for, in response to determining that the filtering rule and the second filtering rule are similar, installing the filtering rule in a physical network interface card to apply the filtering rule to determine whether to discard packets received from the network that match the one or more characteristics.

Example 36 is the apparatus of Example 34, further comprising: means for applying the filtering rule to packets addressed to a second virtual machine to determine whether any of the packets match the one or more characteristics of the packet determined to be malicious are to be discarded.

What is claimed is:
1. A method, comprising:
   accessing, by a hypervisor executing by a processing device, a filtering queue that stores at least one packet determined to be malicious by a virtual machine, wherein the filtering queue is in a virtual network interface card (NIC) of the virtual machine;

generating, by the hypervisor, a filtering rule in view of characteristics of the at least one packet determined to be malicious by the virtual machine;
storing the filtering rule associated with the virtual machine in a data store;
applying the filtering rule to a first packet addressed to the virtual machine to determine whether the first packet has similar characteristics with the at least one packet determined to be malicious, the similar characteristics comprising at least one of a source address of the first packet, one or more data fields in the first packet, one or more data types associated with the first packet, or format of the first packet;
receiving, by the hypervisor, a second packet addressed to a second virtual machine;
responsive to receiving the second packet, determining whether the second virtual machine satisfies a trust condition pertaining to the virtual machine, wherein determining whether the second virtual machine satisfies the trust condition comprises verifying whether the virtual machine and the second virtual machine are associated with a same user;
responsive to determining that the second virtual machine satisfies the trust condition pertaining to the virtual machine, determining whether the filtering rule associated with the virtual machine is enabled;
responsive to determining that the filtering rule associated with the virtual machine is enabled, applying the filtering rule to the second packet addressed to the second virtual machine; and
responsive to determining that the filtering rule associated with the virtual machine is disabled, transmitting the second packet to the second virtual machine.

2. The method of claim 1, further comprising:
receiving, by the hypervisor, a third packet addressed to the virtual machine; and
in response to determining that the third packet has similar characteristics with the at least one packet determined to be malicious, discarding the third packet.

3. The method of claim 1, further comprising:
accessing, by the hypervisor, a second filtering queue of the second virtual machine, the second filtering queue storing at least a third packet determined to be malicious by the second virtual machine;
generating, by the hypervisor, a second filtering rule in view of characteristics of the third packet determined to be malicious; and
in response to determining that the filtering rule and the second filtering rule match, installing the filtering rule in a physical network interface card (NIC) to apply to packets at the physical NIC to determine whether any of the packets have similar characteristics with the at least one packet and the third packet determined to be malicious.

4. The method of claim 1, further comprising:
accessing, by the hypervisor, a second filtering queue of the second virtual machine, the second filtering queue storing at least a third packet determined to be malicious by the second virtual machine, wherein the first virtual machine and the second virtual machine do not satisfy a trust condition;
generating, by the hypervisor, a second filtering rule in view of characteristics of the third packet determined to be malicious; and
in response to determining that the filtering rule and the second filtering rule match, storing the filtering rule in a data store to apply to subsequent packets addressed to the virtual machine and the second virtual machine to determine whether any of the subsequent packets have similar characteristics with the at least one packet and the third packet determined to be malicious.

5. The method of claim 1, wherein the filtering queue is designated for packets flagged as malicious.

6. The method of claim 1, further comprising:
removing, by the hypervisor, the filtering rule after a predefined time period; and
transmitting the subsequent packets to the virtual machine to facilitate determination of whether the subsequent packets are malicious.

7. The method of claim 1, further comprising:
temporarily suspending, by the hypervisor, the filtering rule for a set period of time; and
sending the subsequent packets to the virtual machine to facilitate determination of whether the subsequent packets are malicious while the filtering rule is temporarily suspended.

8. The method of claim 1, further comprising:
adding metadata included with the packet to the filtering rule when the filtering rule is generated, the metadata comprising a type of malicious packet; and
logging the discarding of any of the subsequent packets and the metadata in an event log.

9. The method of claim 1, further comprising receiving, from the virtual machine, a signal comprising the packet and metadata included with the packet by the virtual machine, the metadata providing an indication that the packet is no longer flagged as malicious by the virtual machine.

10. The method of claim 1, wherein an application on the virtual machine flags the packet as being malicious and adds the packet to the filtering queue.

11. A system comprising:
a memory;
a processing device coupled to the memory, the processing device executing a hypervisor to:
receive a packet that is addressed to a virtual machine;
determine one or more characteristics of the packet;
compare the one or more characteristics with a filtering rule associated with the virtual machine, the filtering rule being created in view of a previous packet determined to be malicious by the virtual machine by accessing a filtering queue in a virtual network interface card (NIC) of the virtual machine, the filtering queue being designated for packets determined to be malicious by the virtual machine, and the one or more characteristics comprising at least one of a source address of the previous packet, one or more data fields in the previous packet, one or more data types associated with the previous packet, or format of the previous packet;
responsive to a determination that the one or more characteristics match the filtering rule, discard the packet;
receive a second packet that is addressed to a second virtual machine;
responsive to receiving the second packet, determine whether the second virtual machine satisfies a trust condition pertaining to the virtual machine, wherein to determine whether the second virtual machine satisfies the trust condition, the processing device is to verify whether the virtual machine and the second virtual machine are associated with a same user;
responsive to determining that the second virtual machine satisfies the trust condition pertaining to the virtual machine, determine whether the filtering rule associated with the virtual machine is enabled;
responsive to determining that the filtering rule associated with the virtual machine is enabled:
compare one or more characteristics of the second packet with the filtering rule created in view of the previous packet determined to be malicious by the virtual machine, and
responsive to a determination that the one or more characteristics of the second packet match the filtering rule, discard the second packet; and
responsive to determining that the filtering rule associated with the virtual machine is disabled, transmit the second packet to the second virtual machine.

12. The system of claim 11, wherein the processing device further executes the hypervisor to, responsive to a determination that the one or more characteristics do not match the filtering rule, transmit the packet to the virtual machine.

13. The system of claim 11, wherein the filtering rule was created in view of the previous packet by accessing a filtering queue of the virtual machine to retrieve the previous packet, the filtering queue designated for packets determined to be malicious.

14. The system of claim 11, wherein the processing device further executes the hypervisor to:
remove the filtering rule after a predefined time period;
receive a subsequent packet addressed to the virtual machine; and
transmit the subsequent packet to the virtual machine without determining whether one or more characteristics of the subsequent packet match the filtering rule.

15. One or more tangible, non-transitory computer-readable media storing instructions that, when executed, cause one or more processing devices executing a virtual machine to:
receive, at an application executing under a guest operating system of the virtual machine, a packet from a hypervisor;
determine, by the application executing under a guest operating system of the virtual machine, that the packet is malicious; and
add, by the application executing under a guest operating system of the virtual machine, the packet to a filtering queue in a virtual network interface (NIC) of the virtual machine, the filtering queue being designated for malicious packets to cause subsequent packets that match one or more characteristics of the packet to be discarded before being provided to the virtual machine, the one or more characteristics comprising at least one of a source address of the packet, one or more data fields in the packet, one or more data types associated with the packet, or format of the packet.

16. The computer-readable media of claim 15, wherein the one or more processing devices executing the virtual machine are further to:
add metadata to the packet prior to adding the packet to the filtering queue, the metadata including at least a type of malicious packet.

17. The computer-readable media of claim 15, wherein the one or more processing devices executing the virtual machine are further to:
install an update to the application to eliminate malicious activity to be caused by the packet;
add metadata to the packet, the metadata indicating that the packet is no longer malicious; and
send a signal to the hypervisor including the packet with the metadata.

18. The computer-readable media of claim 15, wherein the one or more processing devices executing the virtual machine are further to:
store packets determined to be malicious in a data store of the virtual machine; and
responsive to determining that a number of packets in the data store exceeds a threshold, add the packets in the data store to the filtering queue.

* * * * *